(12) United States Patent
Yedlapalli et al.

(10) Patent No.: US 8,594,167 B2
(45) Date of Patent: Nov. 26, 2013

(54) DETERMINING SPECTRAL SAMPLES OF A FINITE LENGTH SEQUENCE AT NON-UNIFORMLY SPACED FREQUENCIES

(75) Inventors: Satya Sudhakar Yedlapalli, Bangalore (IN); Kuchibhotla Venkata Subrahmanya Hari, Bangalore (IN)

(73) Assignee: Indian Institute of Science, Karnataka (IN)

( * ) Notice: Subject to any disclaimer, the term of this patent is extended or adjusted under 35 U.S.C. 154(b) by 72 days.

(21) Appl. No.: 13/265,498

(22) PCT Filed: Nov. 4, 2010

(86) PCT No.: PCT/IB2010/054994
§ 371 (c)(1),
(2), (4) Date: Oct. 20, 2011

(87) PCT Pub. No.: WO2012/025797
PCT Pub. Date: Mar. 1, 2012

(65) Prior Publication Data
US 2012/0183032 A1    Jul. 19, 2012

(30) Foreign Application Priority Data

Aug. 25, 2010   (IN) .......................... 2468/CHE/2010

(51) Int. Cl.
*H04B 3/46*          (2006.01)
(52) U.S. Cl.
USPC ............................ 375/224; 370/210; 708/200
(58) Field of Classification Search
USPC ............................ 375/224; 370/210; 708/200
See application file for complete search history.

(56) References Cited

U.S. PATENT DOCUMENTS

| | | | | |
|---|---|---|---|---|
| 5,357,594 | A * | 10/1994 | Fielder | 704/200.1 |
| 5,649,054 | A * | 7/1997 | Oomen et al. | 704/229 |
| 7,181,389 | B2 * | 2/2007 | Liljeryd et al. | 704/219 |
| 2002/0065649 | A1 * | 5/2002 | Kim | 704/219 |
| 2011/0113288 | A1 * | 5/2011 | Ramakrishnan et al. | 714/38.1 |
| 2011/0264721 | A1 * | 10/2011 | Patel et al. | 708/209 |
| 2012/0185525 | A1 * | 7/2012 | Yedlapalli et al. | 708/318 |

OTHER PUBLICATIONS

Bagchi. S. and Mitra. S.K .. "The nonuniform discrete Fourier transform and its applications in filter design. II. 2-D," IEEE Transactions on Circuits and Systems II: Analog and Digital Signal Processing, 1996,434-444 vol. 43, Issue. 6.*

(Continued)

*Primary Examiner* — Daniel Washburn
*Assistant Examiner* — Amneet Singh
(74) *Attorney, Agent, or Firm* — Moritt Hock & Hamroff LLP; Steven S. Rubin

(57) ABSTRACT

Techniques disclosed herein are generally related to methods and devices for determining spectral samples for a finite length sequence. Some example methods include, for each time-indexed sample in a data sample sequence comprising a plurality of samples, generating a sample-specific phase value set associated with a respective time index of the sample and a set of predetermined frequencies. Some examples further include, mapping each sample-specific phase value set to a corresponding sample-specific iso-phasor set and calculating an altered iso-phasor set. Some examples include generating a rotated sample value set by unmapping the altered iso-phasor set to obtain real and imaginary components of the sample rotated by the corresponding sample-specific phase value set. Some addition examples include summing selected rotated sample values from each of the sets of rotated sample values to create a spectral sample vector having a spectral sample of the sequence and outputting the spectral sample vector.

20 Claims, 9 Drawing Sheets

(56) References Cited

OTHER PUBLICATIONS

Belmont, MR., "An extension of Nyquist's theorem to non-uniformly sampled finite length data," International Journal of Adaptive Control and Signal Processing,1995, pp. 163-181, vol. 9, Issue 2.*

Bilinskis, I, and Cain, G., "Fully digital alias-free processing of sensor signals in a substantially enlarged frequency range," Sensor Review, 1997, pp. 54-63, vol. 17, Issue 1.*

Dutt, A, and Rokhlin, V., "Fast Fourier transforms for Nonequispaced Data," SIAM Journal on Scientific computing, 1993, pp. 1368-1393, vol. 14, No. 6.*

Liu, Q.H. and Nguyen, N., "An accurate algorithm for nonuniform fast Fourier transforms (NUFFT's)," IEEE Microwave and Guided Wave Letters, 1998, pp. 18-20, vol. 8, Issue 1.*

Makur, A, and Mitra, S.K., "Warped Discrete-Fourier Transform: Theory and Applications," IEEE Transactions on Circuits and Systems-I: Fundamental Theory and Applications, 2001, pp. 1086-1093, vol. 48, No. 9.*

Sarkar, I. and Fam, AT, "The interlaced chirp Z transform," Signal Processing, 2006, pp. 2221-2232, vol. 86, Issue 9.*

Singh, S, and Srinivasan, S., "Architecturally efficient FFT pruning algorithm," IEEE Electronics Letters, 2005, pp. 1305-1306, vol. 41, Issue 23.*

Sreenivas, T. and Rao, P., "High-resolution narrow-band spectra by FFT pruning," IEEE Transaction on Acoustics, Speech, Signal Process, 1980, pp. 254-257, vol. 28, Issue. 2.*

Yedlapalli, S., and Hari, KVS., "The Line Spectral Frequency model of a Finite-Length Sequence," IEEE Journal of Selected Topics in Signal processing, 2010, pp. 646-658 , vol. 4, Issue 3.*

Bland, D. M., Laakso, T.I., and Tarezynski, A., "Application of NUT-DFT for Resampling Nonuniformly Sampled Signals" IEEE Electronics, Circuits, and Systems, 1996, pp. 586-589, vol. 1, 0-7803-3650-X.*

Rozwod, W. J., Therrien, C. W., and Lim, J. S., "Design of 2-D FIR Filters by Nonuniform Frequency Sampling" IEEE Transactions on Signal Processing, Nov. 1991, pp. 2508-2514, . vol. 39. No. II.*

Sommen, P and Janse, K., "On the Relationship Between Uniform and Recurrent Nonuniform Discrete-Time Sampling Schemes" Oct. 2008,IEEE Transactions on Signal Processing, vol. 56, No. 10, pp. 5147-5156.*

Tarczynski, A., "Spectrum estimation of nonuniformly sampled signals" 2002, IEEE DSP, vol. 2, pp. 795-798.*

Bagchi. S. and Mitra. S.K .. "The nonuniform discrete Fourier transform and its applications in filter design. Part-I. 1-D," IEEE Transactions on Circuits and Systems II: Analog and Digital Signal Processing, 1996,434-444 vol. 43, Issue. 6.*

Lee,Jun.-Yub and Greengard, L.,"The type 3 nonuniform FFT and its applications" 2005, Journal of Computational Physics 206, pp. 1-5.*

Bagchi, S. and Mitra, S.K., "The nonuniform discrete Fourier transform and its applications in filter design. II. 2-D," IEEE Transactions on Circuits and Systems II: Analog and Digital Signal Processing, 1996,434-444 vol. 43, Issue. 6.

Belmont , M.R., "An extension of Nyquist's theorem to non-uniformly sampled finite length data," International Journal of Adaptive Control and Signal Processing,1995, pp. 163-181, vol. 9, Issue 2.

Makur, A, and Mitra, S.K., "Warped Discrete-Fourier Transform: Theory and Applications," IEEE Transactions on Circuits and Systems—I: Fundamental Theory and Applications, 2001, pp. 1086-1093, vol. 48, No. 9.

Sarkar, I. and Fam, A.T., "The interlaced chirp Z transform," Signal Processing, 2006, pp. 2221-2232, vol. 86, Issue 9.

Yedlapalli, S., and Hari, K.V.S., "The Line Spectral Frequency model of a Finite-Length Sequence," IEEE Journal of Selected Topics in Signal processing, 2010, pp. 646-658 , vol. 4, Issue 3.

S. S. Yedlapalli, "The Line Spectral Representation of a Sequence and Its Applications to Signal Processing," Ph. D. Thesis Colloquium, Indian Institute of Science ,Bangalore, Nov. 27, 2008, 3 pages.

Painter, T. "A Review of Algorithms for Perceptual Coding of Digital Audio Signals" Jul. 2-4, 1997 DSP 1997 Proceedings.

Makur, A., et al. "Warped Discrete Fourier Transform: Theory and Applications" IEEE Transactions on Circuits and Systems—I Fundamental Theory and Applications,vol. 48, No. 9, Sep. 2001.

International Search Report and Written Opinion from International Application No. PCT/IB2010/054994 dated Mar. 4, 2011.

* cited by examiner

270 

271
$[f_{des}:3] = \{-0.36, -0.27, 0.1247, 0.1255\}$ 274     272
$P_f = 9$     $\varepsilon_f = 10$ 276   $[k_{des}:3]$   $\{-184.32, -138.24, 63.846, 64.256\}$
278   $[\hat{k}_{des}:3]$   $\{-184, -138, 64, 64\}$
280   $[\hat{f}_{des}:3]$   $\{-0.359375, -0.26953125, 0.125, 0.125\}$
282   $[\hat{\delta}_{des}:3]$   $\{-0.359375, 0.08984375, 0.39453125, 0\}$ $P_f = 10$     $\varepsilon_f = 11$ $[k_{des}:3]$   $\{-368.64, -276.48, 127.69, 128.51\}$
   $[\hat{k}_{des}:3]$   $\{-369, -276, 128, 129\}$
   $[\hat{f}_{des}:3]$   $\{-0.36035, -0.26953, 0.125, 0.12598\}$
   $[\hat{\delta}_{des}:3]$   $\{-0.36035, 0.09082, 0.39453, 0.00097656\}$ $P_f = 11$     $\varepsilon_f = 12$ $[k_{des}:3]$   $\{-737.28, -552.96, 255.39, 257.02\}$
   $[\hat{k}_{des}:3]$   $\{-737, -553, 255, 257\}$
   $[\hat{f}_{des}:3]$   $\{-0.35986, -0.27002, 0.12451, 0.12549\}$
   $[\hat{\delta}_{des}:3]$   $\{-0.35986, 0.089844, 0.39453, 0.00097656\}$ $P_f = 14$     $\varepsilon_f = 15$ $[k_{des}:3]$   $\{-5898.2, -4423.7, 2043.1, 2056.2\}$
   $[\hat{k}_{des}:3]$   $\{-5898, -4424, 2043, 2056\}$
   $[\hat{f}_{des}:3]$   $\{-0.35999, -0.27002, 0.12469, 0.12549\}$
   $[\hat{\delta}_{des}:3]$   $\{-0.35999, 0.089966, 0.39471, 0.00079346\}$

$[f_{des}:5]=\{-0.27695, -0.04453, -0.02695, 0.33047, 0.34805\}$ 293    294 n=1

Iso-Phasor Indices

| $r$ | $\widetilde{\alpha}[r,n]$ | $l[r,n]$ | $h_0[r,n]$ | $s1[r,n]$ | $s0[r,n]$ |
|---|---|---|---|---|---|
| 0 | -0.27734 | -5 | 28 | -2 | 3 |
| 1 | -0.04492 | -1 | 46 | -1 | 3 |
| 2 | -0.02734 | -1 | 28 | -1 | 3 |
| 3 | 0.33008 | 5 | 46 | 1 | 1 |
| 4 | 0.34766 | 5 | 28 | 1 | 1 |

Vector $Y_1$

| $r$ | $y[r,n]$ | $\widehat{y}[r,n]$ |
|---|---|---|
| 0 | 0.37707+j0.84152 | 0.3771+j0.84176 |
| 1 | 0.27468+j0.75601 | 0.27493+j0.756 |
| 2 | 0.26369+j0.757 | 0.26393+j0.75696 |
| 3 | 0.20988+j0.92905 | 0.2097+j0.92888 |
| 4 | 0.21835+j0.93613 | 0.21815+j0.93598 |

296 n=2

Iso-Phasor Indices

| $r$ | $\widetilde{\alpha}[r,n]$ | $l[r,n]$ | $h_0[r,n]$ | $s1[r,n]$ | $s0[r,n]$ |
|---|---|---|---|---|---|
| 0 | 0.44629 | 7 | 55 | 1 | 3 |
| 1 | -0.08887 | -2 | 37 | -1 | 2 |
| 2 | -0.05371 | -1 | 55 | -1 | 3 |
| 3 | -0.33887 | -6 | 37 | -2 | 2 |
| 4 | -0.30371 | -5 | 55 | -2 | 3 |

Vector $Y_2$

| $r$ | $y[r,n]$ | $\widehat{y}[r,n]$ |
|---|---|---|
| 0 | 0.34981+j0.5729 | 0.34952+j0.57318 |
| 1 | 0.24242+j1.02408 | 0.24299+j1.02411 |
| 2 | 0.29094+j1.02562 | 0.29151+j1.02555 |
| 3 | -0.05819+j0.89679 | -0.05841+j0.89695 |
| 4 | -0.05027+j0.96338 | -0.05044+j0.96356 |

298 n=3

Iso-Phasor Indices

| $r$ | $\widetilde{\alpha}[r,n]$ | $l[r,n]$ | $h_0[r,n]$ | $s1[r,n]$ | $s0[r,n]$ |
|---|---|---|---|---|---|
| 0 | 0.16895 | 2 | 45 | 0 | 2 |
| 1 | -0.13379 | -3 | 9 | -1 | 1 |
| 2 | -0.08105 | -2 | 45 | -1 | 2 |
| 3 | -0.00879 | -1 | 9 | -1 | 3 |
| 4 | 0.04395 | 0 | 45 | 0 | 0 |

Vector $Y_3$

| $r$ | $y[r,n]$ | $\widehat{y}[r,n]$ |
|---|---|---|
| 0 | -0.37588+j0.90961 | -0.37658+j0.909 |
| 1 | 0.1601+j0.22832 | 0.16165+j0.22825 |
| 2 | -0.04577+j0.29993 | -0.04431+j0.29945 |
| 3 | -0.67908+j0.39231 | -0.67868+j0.39171 |
| 4 | -0.8015+j0.68833 | -0.80133+j0.68759 |

FIGURE 2D

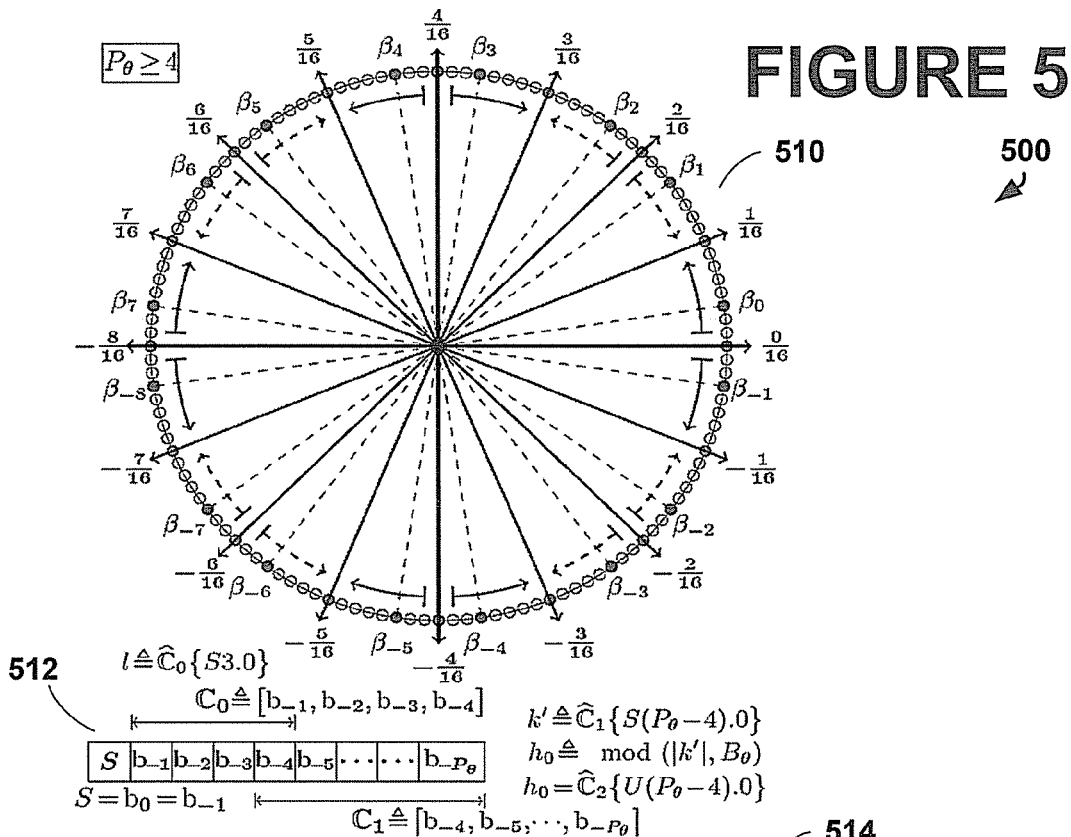

FIGURE 5

Indices

For each sector index-$l$, $-8 \le l \le 7$, $\frac{l}{16} \le \hat{\theta}\{S0.P_\theta\} < \frac{(l+1)}{16}$ The iso-phase index-$h_0$, $0 \le h_0 < B_\theta$ for $B_\theta \triangleq 2^{(P_\theta-4)}$, $J_A = 2^{-P_\theta}$;

For $h_0 = 0$, the iso-phase index-$h_l = lB_\theta$.

For $h_0 \ne 0$, the iso-phase index-$h_l$ is defined as:
$$h_l \triangleq \begin{cases} lB_\theta + h_0, & l - \text{Even} \\ (l+1)B_\theta - h_0, & l - \text{Odd} \end{cases}$$

For the phase index-$h$, $\hat{\theta}[h] = hJ_A$ and the 16-iso-phases defined by iso-phase index-$h_0$ are given by $\hat{\theta}[h_l] = h_l J_A$. Hence each $h$ maps to a unique $h_l$ defined by the pair $[l, h_0]$.

For $P_\theta \ge 4$, $-8B_\theta \le h < 8B_\theta$.
For $P_\theta = 3$, $-4 \le h < 4$.
For $P_\theta = 2$, $-2 \le h < 2$.
For $P_\theta = 1$, $\hat{\theta}[-1] = -\frac{1}{2}$, $\hat{\theta}[0] = 0$.

Iso-Phasors

For $P_\theta \ge 4$, an iso-phasor is a 16-dimensional column vector with 16-phasors defined by a single phase $\beta_0 = h_0 J_A$, $0 \le \beta_0 < \frac{1}{16}$.

As each iso-phasor is a function of integer $h_0$, we denote an iso-phasor as $\beta_{h_0}^{iso}$ with elements as the sequence $[\beta_{h_0}^{iso} : 16]$, $\beta_{h_0}^{iso}[l+8] \triangleq e^{-j2\pi\beta_l}$, $-8 \le l \le 7$.

As all the phasors in an iso-phasor are effectively defined by one non-trivial phase value these are referred as iso-phasors (having same equivalent phase of $\beta_0$).

For $h_0 = 0$, $\beta_l = \frac{l}{16}$ and for $1 \le h_0 < B_\theta$, $\beta_l = h_l J_A$.

Hence all the phasors in $\beta_0^{iso}$ precisely lie on the boundaries of each sector(as shown above). The phasors in the rest of the iso-phasors lie within each sector(other than the boundaries for example $\beta_3^{iso}$ as above).

DETERMINING SPECTRAL SAMPLES OF A FINITE LENGTH SEQUENCE AT NON-UNIFORMLY SPACED FREQUENCIES

CROSS-REFERENCE TO RELATED APPLICATION

The present application claims priority to Indian patent application serial number 2468/CHE/2010 filed on Aug. 25, 2010, the entire contents of which is incorporated by reference. The present application is a U.S. National Phase Application pursuant to 35 U.S.C. §371 of International Application No. PCT/IB2010/054994 filed on Nov. 4, 2011, the entire contents of which are herein incorporated by reference.

BACKGROUND

Unless otherwise indicated herein, the materials described in this section are not prior art to the claims in this application and are not admitted to be prior art by inclusion in this section.

Digital signal processing (DSP) is a technical field concerned with the representation of continuous analog signals by a sequence of discrete numbers or symbols and the processing of such discrete sequences. DSP applications process signals to measure, filter, manipulate, and/or compress continuous analog signals. A step in a DSP application may be to convert a continuous analog signal to a sequence of discrete digital samples. Such digital sampling may be performed by an analog-to-digital converter (ADC). Further, the output signal for a DSP application may be another continuous analog output signal, which may use a digital-to-analog converter (DAC) to transform a sequence of digital samples into the continuous analog signal. DSP applications include audio and speech signal processing, sonar and radar signal processing, sensor array processing, spectral estimation, statistical signal processing, digital image processing, signal processing for communications, control of systems, biomedical signal processing, seismic data processing, etc.

DSP algorithms may be performed by standard computers, computing devices or microprocessors, by specialized processors called digital signal processors (DSPs), or on specialized hardware such as application-specific integrated circuit (ASICs). In addition, digital signal processing may be performed on more powerful general purpose microprocessors, field-programmable gate arrays (FPGAs), digital signal controllers (mostly for industrial application such as motor control), and stream processors, among others.

Oftentimes, a digital signal processing system incorporates a transform from a discrete time-domain signal to a discrete frequency-domain signal. A discrete time-domain signal is a digital signal that has separate samples that have been sampled with respect to time. With such a signal, each sample corresponds to a different point in time. The value of each sample corresponds to the magnitude of the sampled signal at a given time. The discrete time-domain signal may be sampled at uniform time samples or at non-uniform time samples. For example, an incoming radio frequency wireless signal may be sampled at 1 microsecond intervals to create a discrete time-domain digital signal.

Once the radio frequency has been sampled in the time domain, creating a discrete time-domain signal, it is possible to use a mathematical transform to convert a time domain sample into a frequency-domain sample. The Fourier Transform is an operation that can be used to transform time-domain signals into frequency-domain signals. For example, in an OFDM communication system, data is received and sampled in the time domain. These discrete time-domain samples are converted to frequency-domain samples through the Fourier transform operation. The frequency bins associated with the frequency-domain signal contain data.

SUMMARY

Disclosed are embodiments for methods and devices for determining spectral samples for a finite length sequence. In some embodiments the device includes a phase rotation set generator configured to generate sample-specific phase-value sets, each phase-value set associated with a respective time index of a sample from the finite length sequence, and a set of predetermined frequencies. The devices may also include an iso-phasor mapper configured to map each sample-specific phase-value set to a corresponding sample-specific iso-phasor set, a multiplier configured to calculate an altered iso-phasor set, an unmapper configured to generate a rotated sample value set by unmapping the altered iso-phasor set to obtain real and imaginary components of the sample, and a summer configured to sum selected rotated sample values from each of the rotated sample value sets to generate a spectral sample vector.

In some embodiments the device may also include a frequency mapper configured to generate the predetermined frequencies and to determine a set of available iso-phasors for inclusion in the sample-specific iso-phasor sets. The frequency mapper can also contain an error calculator configured to compare an error between the desired frequency and the predetermined frequency to an acceptable error threshold, and when the acceptable error threshold is exceeded, the frequency mapper is further configured to increase the number of available iso-phasors. The iso-phasor mapper in the device can be configured to generate at least one codeword associated with each sample-specific phase-value, the codeword being used by the unmapper to unmap the altered iso-phasor set.

Another disclosed embodiment is an article of manufacture including a computer readable medium having instructions stored that can be executed by a computing device. In one embodiment the instructions include, for each sample in a sequence, generating a sample-specific phase value set associated with a respective time index of the sample and a set of predetermined frequencies, mapping each sample-specific phase value set to a corresponding sample-specific iso-phasor set, calculating an altered iso-phasor set from each sample-specific iso-phasor set and its corresponding sample, generating a rotated sample value set by unmapping the altered iso-phasor set to obtain real and imaginary components of the sample rotated by the corresponding sample-specific phase value set, and summing selected rotated sample values from each rotated sample value sets to generate a spectral sample vector.

In some embodiments, the article of manufacture may contain more instructions, including generating the predetermined frequencies with a frequency mapper, determining a set of available iso-phasors for inclusion in the sample-specific iso-phasor sets, comparing an error between a desired frequency and a corresponding predetermined frequency to a predetermined threshold, increasing the number of available iso-phasors if the error exceeds the predetermined threshold, generating at least one codeword associated with each sample-specific phase-value in the sample-specific phase-value set, and unmapping the altered iso-phasor set is based upon the at least one codeword.

An additional embodiment discloses a method for determining spectral samples for a finite length sequence. The method encompasses, for each sample in a data sample sequence comprising a plurality of time-indexed samples, generating a sample-specific phase value set associated with a respective time index of the sample and a set of predetermined frequencies, mapping each sample-specific phase value set to a corresponding sample-specific iso-phasor set, calculating an altered iso-phasor set from each sample-specific iso-phasor set and its corresponding sample, generating a rotated sample value set by unmapping the altered iso-phasor set to obtain real and imaginary components of the sample rotated by the corresponding sample-specific phase value set, and summing selected rotated sample values from each rotated sample value sets to generate a spectral sample vector.

In some embodiments a method may also include generating the predetermined frequencies with a frequency mapper, determining a set of available iso-phasors for inclusion in the sample-specific iso-phasor sets, comparing an error between a desired frequency and a corresponding predetermined frequency to a predetermined threshold, increasing the number of available iso-phasors if the error exceeds the predetermined threshold, generating at least one codeword associated with each sample-specific phase-value in the sample-specific phase-value set, and unmapping the altered iso-phasor set is based upon the at least one codeword.

The Fourier Transform can be a very computationally intensive calculation and much of the resulting data can be of little interest. The computation generally requires time and frequency samples to be uniformly spaced. By using the methods and apparatuses disclosed herein, spectral content of a signal can be calculated in a computationally efficient manner, and forgo the uniform spacing restrictions generally associated with Fourier Transforms.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

In the drawings:

FIG. 2C is an example of the mapping of a desired set of frequencies to a set of available frequencies for different bit lengths;

FIG. 2D is an example of different indices and vectors for an example data set used for spectral vector creation;

FIG. 5 is an example normalized phase plane and the mapping of iso-phasors;

DETAILED DESCRIPTION

Figure 1:
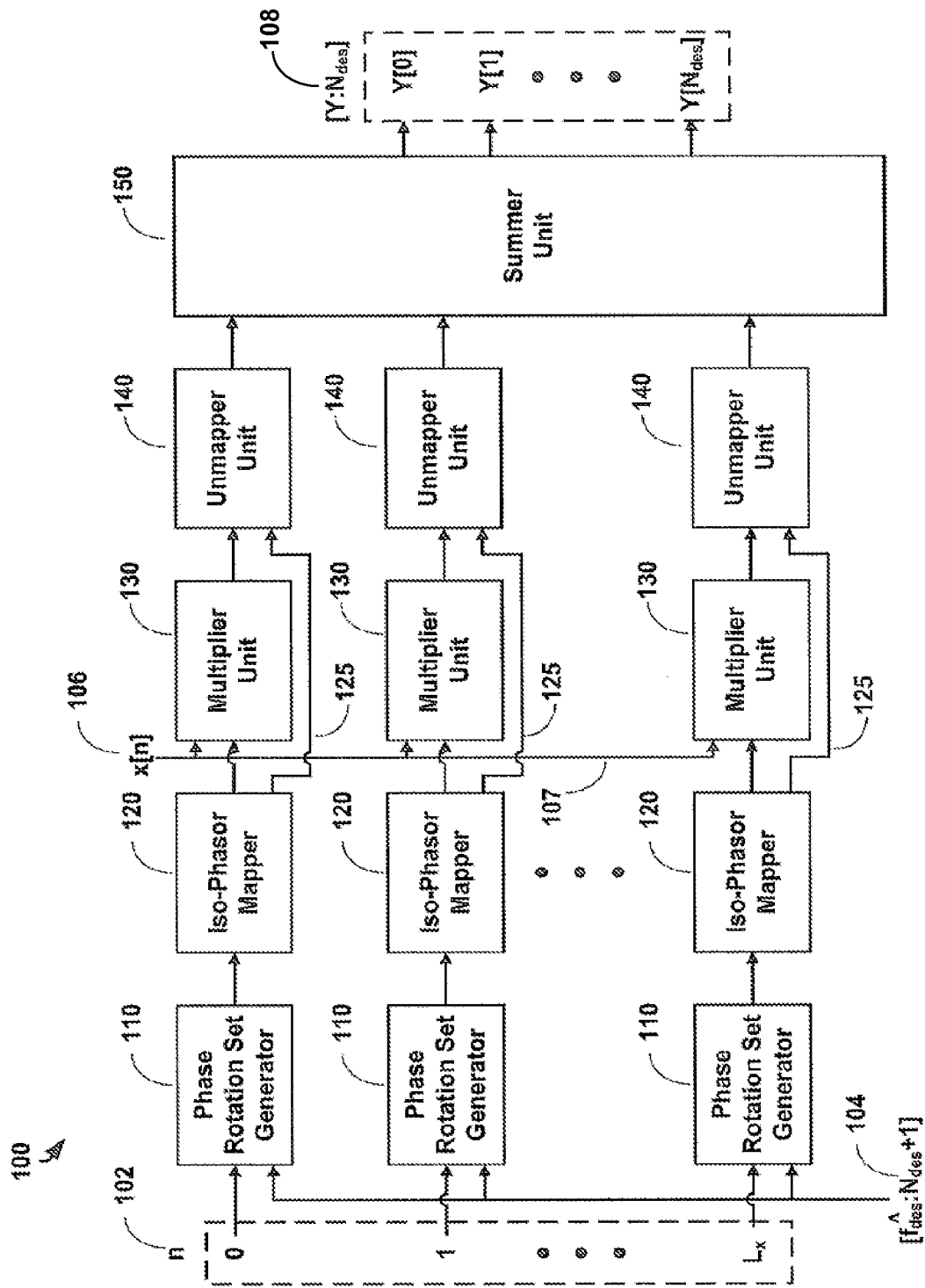
FIG. 1 is a is a functional block diagram of an example digital signal processing (DSP) system for use to generate spectral samples of a finite length discrete sequence.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is drawn, inter alia, to devices, methods, and articles of manufacture related to signal processing.

Briefly stated, techniques disclosed herein are generally related to methods and devices for determining spectral samples for a finite length sequence. In some example methods include, for each time-indexed sample in a data sample sequence comprising a plurality of samples, generating a sample-specific phase value set associated with a respective time index of the sample and a set of predetermined frequencies. Some examples further include, mapping each sample-specific phase value set to a corresponding sample-specific iso-phasor set and calculating an altered iso-phasor set. Some examples include generating a rotated sample value set by unmapping the altered iso-phasor set to obtain real and imaginary components of the sample rotated by the corresponding sample-specific phase value set. Some additional examples include summing selected rotated sample values from each of the sets of rotated sample values to create a spectral sample vector having a spectral sample of the sequence and outputting the spectral sample vector.

Some real-time signal processing applications also require precise Discrete Time Fourier Transform (DTFT) samples at a few critical values of the frequencies. For example, the multi-carrier modems which use Discrete-Multi-Tone Modulation (DMT) or Orthogonal Frequency Division Multiplexing (OFDM) measure the active channel frequency response at some predefined frequencies called pilots (tones/carrier-frequencies). As the frequency resolution of these pilot frequencies are fixed by design, these modems compute the Discrete Fourier Transform (DFT) values using an FFT. As the number of pilots are relatively smaller in number compared to the total carriers/tones, it may not be cost-effective to compute the DFT completely (even with an FFT) and subsequently select the desired values as defined by the pilot frequencies. Further, as the frequency resolution decreases, this frequency response sensing can be cumbersome as it also increases the computational cost. This problem of channel response sensing at a predefined frequencies can be looked as a sparse sampling of a DTFT and it may be desirable to compute exclusively these desired spectral samples by alternate methods.

In spectral analysis there are generally two phases of analysis. The first phase of spectral analysis generally corresponds to coarse spectral analysis, while the second phase of spectral analysis generally corresponds to fine spectral analysis. The coarse phase of spectral analysis is generally concerned with fluctuations of the spectrum i.e., the frequency spacing is larger compared to fine phase. In the fine phase of spectral analysis, the knowledge of the previous spectral queries can be utilized such that the spectral analysis may process fewer frequencies but the processing may be performed more precisely than in the coarse phase. Both these phases have multiple spectral queries and each query iteratively re-defines the desired frequencies $f_{DES}$, frequency separation $\Delta_{DES}$, and number of desired frequencies $N_{DES}+1$.

Classical FFT algorithms attempt to minimize the computational complexity of the DFT computation. An FFT achieves this by grouping the samples based on different criteria. For example, the radix-2-DIT/DIF $N_f$-point FFT recursively computes an $N_f$-point DFT in terms of two $N_f=2$-point DFTs and in this process requires $N_f=2^m$ (m-an integer). The Split-radix FFT minimizes multiplications with an alternate grouping of the DFT samples defined by an efficient indexing structure. For each $N_f$-point DFT, not all frequencies within the set of desired frequencies may match closely with the uniform sampled frequencies. This discrepancy limits the spectral sampling irrespective of the computational efficiency of the FFT. If one has to make this discrepancy more agreeable; $N_f$ can be increased which makes the data for the FFT larger.

Further in discrete systems increasing $N_f$ to increase frequency resolution translates to an exponential increase in the number of padded zeros. Increasing the frequency resolution boils down to increasing the complexity of the FFT due to a virtual data growth, without any significant increase in the effective number of input data samples. Hence a conventional DFT system is penalized computationally due to (i) the inevitable error due to the fixed point approximation of the desired frequencies (ii) zero-padding required by uniform sampling in the DFT. The computational cost penalty reveals the limitation of DFT whose spectral sampling resolution $$\Delta_f = \frac{1}{N_f} \leq \Delta_{DES}$$

is dictated by the transform length $N_f$.

The limitations of conventional DFT systems can be addressed by the apparatuses and methods for non-uniform sampling of the DTFT X(f) of [x:($L_x$+1)] using an efficient calculation of the NuFFT (Non-uniform FFT) which gives complete freedom in frequency resolution ([$f_{DES}$:($N_{DES}$+1)]) without any abnormal increase in virtual data length as in the zero-padding process. As the sequence x is invariant across spectral queries, the spectral properties of x can be used for this sparse sampling.

FIG. 1 is a functional block diagram of an example digital signal processing (DSP) system for use to generate spectral samples of a finite length discrete sequence, arranged in accordance with at least some examples of the present disclosure. The DSP system 100 is configured to receive a discrete time or digital signal x[n] 106. The discrete time signal may have been sampled from a continuous time analog signal x(t). Examples of continuous time analog signals may be voice or audio, sonar or radar, digital image, biomedical, radio frequency communications, or seismic data signals.

An Analog-to-Digital Converter (ADC) may be configured to receive and convert the continuous analog signal x(t) into a discrete time signal x[n], which may also be described as a sequence of digital samples. For example, the ADC can be configured to sample the analog signal x(t) at a sampling rate of 1/T1 samples per second, where T1 is greater than or equal to the twice the highest frequency contained in the analog signal x(t). Further, the discrete time or digital signal $x_0$[n] 106, is a representation of the continuous time signal x(t), wherein n represents the time index of each sample of the discrete signal. The vector 102 contains $L_x$+1 elements, wherein $L_x$+1 is equal to the number of samples in the discrete time signal x[n]. The vector 102 counts on n from 0 to $L_x$.

Vector 104 contains the predetermined frequencies at which to generate spectral samples, $\hat{f}_{des}$, where the number of frequencies is equal to $N_{des}$+1. In some embodiments the frequencies contained in vector 104 may be entered by a user. In additional embodiments, the desired frequencies entered by a user may be mapped to available frequencies and stored in vector 104. In some embodiments, a calculation is performed to map the desired frequencies to a set of available frequencies, where the output of the calculation corresponds to the available frequencies that are determined to approximately match the desired frequencies as vector 104. The mapping to predetermined frequencies can be based on the number of bits used to quantize data in the system. The number of bits is defined by $P_\theta$+1 and as the number of bits increases, the frequency resolution increases. The vector 108 contains the spectral samples of the discrete time signal x[n]. The vector 108 has a length $L_x$+1, where each element of the vector contains one spectral sample of the discrete time signal x[n] for each frequency specified in vector 104. In one embodiment, the samples in vector 108 are complex value samples comprising a real and imaginary portion. In an additional embodiment, the samples in vector 108 are real-number samples.

In addition to the vectors, FIG. 1 illustrates functional blocks of an embodiment of an example digital signal processing (DSP) system that is configured to generate spectral samples of a finite length discrete sequence. Block 110 is a phase rotation set generator. The phase rotation set generator takes an index value n from the vector 102, and the set of predetermined frequencies $\hat{f}$ from vector 104 to generate a sample-specific phase value set. The sample-specific phase value set contains one sample-specific phase value for each frequency in vector 104, thus the sample-specific phase value set contains $N_{des}$+1 samples. The sample-specific phase values can be calculated by normalizing the phase associated with an exponential equation. The exponential can be normalized to have a phase falling in a range of about +½ to about −½ on the phase plane. All phase values on a plane can be specified by a continuous variable in the range from about +½ to about −½. The phase of a complex number can be written as w[r, n] (r is the frequency index and n is the sample index), and the associated sample-specific phase values can be given by α[r, n] in the equation below:

$$w[r, n] = e^{-j2\pi\alpha[r,n]}$$

$$\alpha[r, n] = npmod(\hat{f}_{des}[r]n)$$

$$npmod\left(\frac{\phi}{2\pi}\right) = \left\{ \begin{array}{l} \beta - 1, \beta \geq \left(\frac{1}{2}\right) \\ \beta + 1, \beta < -\left(\frac{1}{2}\right) \end{array} \right\}$$

$$\beta = mod\left(\frac{\phi}{2\pi}, 1\right)$$

The first modulus function (mod) corresponds to a modulus division operation that is utilized to ensure that the magnitude of β is ≤1, while the second modulus function (npmod) corresponds to a modulus division operation that is utilized to normalize the phase. By normalizing the phase across multiple predetermined frequencies for a single sample, all the sample-specific phase values can be plotted on a single normalized phase plane.

In some embodiments, the phase rotation set generator 110 can be configured to output a continuous variable for each sample-specific phase value, the variable having a value in a range from about +½ to about −½. In further embodiments, the sample-specific phase value is a fixed point approximation of the normalized phase. In the signed fixed point approximation, $P_\theta+1$ bits can be used to store the value of the normalized phase. Thus the number of phases that can be represented by a signed fixed point approximation is $2^{P_\theta+1}$. One skilled in the art would understand how a decimal number can be mapped to a signed fixed point approximation value. In either continuous or fixed point approximation, for each sample n in the discrete sequence, $N_{des}+1$ sample-specific phase values are calculated. The $N_{des}+1$ sample-specific phase values are output from each phase rotation set generator 110.

The differences between signed and unsigned floating point representation (FPR) approximations are generally shown in Table 1 and Table 2 respectively. Table 1 presents a 3-bit signed value and Table 2 presents a 3-bit unsigned value. Each line in the tables corresponds to a different specification for the integer part. When a specified bit-length is used, in this case 3 bits, increasing the number of bits used for the integer component decreases the resolution of the fraction component.

The value of A[h] represents the codeword associated with each bit string. With signed values, the first bit indicated the sign of the associated value, thus in Table 1, S2.0 means the trailing two bits represent the integer portion as the first bit signifies the sign, S1.1 uses one bit for the integer portion and one bit for the decimal portion, and S0.2 uses the two bits for the decimal portion. Since Table 2 represents unsigned values, U3.0 has three bits for the integer portion, U2.1 stores the integer value in the first two bits and the decimal portion in the third bit, U1.2 stores the integer value in the first bit and the decimal portion in the last two bits, and U0.3 uses all three bits for the integer portion.

TABLE 1

Signed Representation

| FPR | A[−4] 100 | A[−3] 101 | A[−2] 110 | A[−1] 111 | A[0] 000 | A[1] 001 | A[2] 010 | A[3] 011 |
|---|---|---|---|---|---|---|---|---|
| S2.0 | −4 | −3 | −2 | −1 | 0 | 1 | 2 | 3 |
| S1.1 | −2 | −1.5 | −1 | −0.5 | 0 | 0.5 | 1 | 1.5 |
| S0.2 | −1 | −0.75 | −0.5 | −0.25 | 0 | 0.25 | 0.5 | 0.75 |

TABLE 2

Unsigned Representation

| FPR | A[0] 000 | A[1] 001 | A[2] 010 | A[3] 011 | A[4] 100 | A[5] 101 | A[6] 110 | A[7] 111 |
|---|---|---|---|---|---|---|---|---|
| U3.0 | 0 | 1 | 2 | 3 | 4 | 5 | 6 | 7 |
| U2.1 | 0 | 0.5 | 1 | 1.5 | 2 | 2.5 | 3 | 3.5 |
| U1.2 | 0 | 0.25 | 0.5 | 0.75 | 1 | 1.25 | 1.5 | 1.75 |
| U0.3 | 0 | 0.125 | 0.25 | 0.375 | 0.5 | 0.625 | 0.75 | 0.875 |

In some examples, it can be assumed that there will be no integer component, and the full bit string can be used for the fractional component. The two charts below show the signed and unsigned codewords for a 4-bit string. As illustrated below, a full range of normalized frequencies can be approximated with either a signed (Table 3) or unsigned values (Table 4). In both tables, the value of $A_{XY}[h]$ represents the codeword associated with each bit string and $\hat{A}_{XY}[h]$ is the decimal representation of $A_{XY}[h]$.

TABLE 3

Signed Representation $A_{10}[h] \in \{1000, 1001, 1010, 1011\}$
$\hat{A}_{10}[h] \in \{-1.0000, -0.8750, -0.7500, -0.6250\}$
$A_{11}[h] \in \{1100, 1101, 1110, 1111\}$
$\hat{A}_{11}[h] \in \{-0.5000, -0.3750, -0.2500, -0.1250\}$
$A_{00}[h] \in \{0000, 0001, 0010, 0011\}$
$\hat{A}_{00}[h] \in \{0, 0.1250, 0.2500, 0.3750\}$
$A_{01}[h] \in \{0100, 0101, 0110, 0111\}$
$\hat{A}_{01}[h] \in \{-1.0000, -0.8750, -0.7500, -0.6250\}$

TABLE 4

Unsigned Representation $A_{00}[h] \in \{0000, 0001, 0010, 0011\}$
$\hat{A}_{00}[h] \in \{0, 0.0625, 0.1250, 0.1875\}$
$A_{01}[h] \in \{0100, 0101, 0110, 0111\}$
$\hat{A}_{01}[h] \in \{0.2500, 0.3125, 0.3750, 0.4375\}$
$A_{10}[h] \in \{1000, 1001, 1010, 1011\}$
$\hat{A}_{10}[h] \in \{0.5000, 0.5625, 0.6250, 0.6875\}$
$A_{11}[h] \in \{1100, 1101, 1110, 1111\}$
$\hat{A}_{11}[h] \in \{0.7500, 0.8125, 0.8750, 0.9375\}$ Table 5 gives examples of how floating point approximations can relate to signed and unsigned strings as well as codewords. The first and second lines show two approximations for the rational number −1/7, the first line shows a signed codeword generated through truncation and the second line shows a signed codeword generated by rounding. Lines 3 and 4 present unsigned approximations for −1/6, where line 3 is truncated and line 4 is rounded. Additionally, the fifth line shows a signed approximation for the truncated value of −10/3, and the sixth line shows an unsigned approximation for the rounded value of −37/9.

TABLE 5

Rounding Floating Point Approximations

| b | a | FPA | Code Word |
|---|---|---|---|
| −1/7 | −0.142857 | â {S0.3, tr} = −0.25 | A[−2] = [1110] |
| −1/7 | −0.142857 | â {S0.3, rd} = −0.125 | A[−1] = [1111] |
| 1/6 | 0.16667 | â {U0.4, tr} = 0.125 | A[2] = [0010] |
| 1/6 | 0.16667 | â {U0.4, rd} = 0.1875 | A[3] = [0011] |
| −10/3 | −3.33333 | â {S2.6, tr} = −3.34375 | A[−214] = [100101010] |
| 37/9 | 4.11111 | â {U3.5, rd} = 4.125 | A[132] = [10000100]. |

The iso-phasor mapper 120 can be configured to receive the $N_{des}+1$ sample-specific phase values from the rotation set generator 110. In embodiments where the sample-specific phase values are stored as continuous variables, the iso-phasor mapper can be configured to map the continuous variables to signed fixed point approximation values, where $P_\theta+1$ bits can be used to store the value of the normalized phase and the number of phases that can be represented by a signed fixed point approximation is $2^{P_\theta+1}$. The value of $P_\theta$ can be chosen based on the desired frequency resolution of the system. In embodiments where the phase rotation generator 110 outputs fixed point approximations, the iso-phasor mapper does not have to determine an initial phase mapping. In some embodiments, the iso-phasor mapper can be configured to divide the phase plane into a number of sectors. An example of the phase plane divided into 16 sectors is given in FIG. 5.

For each signed fixed point approximation sample-specific phase value, the bit string specifying the phase can be considered a codeword by the iso-phasor mapper 120. By utilizing properties associated with the codeword, the sample-specific phase value can be mapped to an iso-phasor located in the first sector of the plane. In some embodiments the mapping of a phase to an iso-phasor can be accomplished with a lookup table.

In one example, the first four (4) bits of the codeword can be utilized to specify a variable l that corresponds to the sector in which the sample-specific phase value resides. Because these four bits come from a signed fix point approximation, the variable l will have a value in a range of about −8 to about +7, corresponding to the sector the sample-specific phase value resides. Each of the 16 sectors can be further divided to $B_\theta$ possible phase values, with the phase values spaced apart by $J_A$. Both variables $B_\theta$ and $J_A$ are defined based on the value of $P_\theta$ with the expression $B_\theta = 2^{P_\theta - 4}$ and $J_A = 2^{-P_\theta}$. The rest of the bits that do not specify the variable l can be used to specify a phase within the sector; this is denoted as the $h_0$ variable. The variable $h_0$, the iso-phasor index, can then be determined by converting the last $P_\theta - 4$ bits of the codeword into an integer, assuming the bits are an unsigned fixed point approximation.

Base on the variables $h_0$ and $J_A$ an iso-phasor $\beta_0$ can be assigned to each sample-specific phase value. The value of iso-phasor index times an interval spacing $J_A$ defines the iso-phasor $\beta_0 = J_A h_0 = h_0 2^{-P_\theta}$. In one embodiment, additional indices s1 and s0 can be calculated. The value of index s1 is an integer value of the second and third bits of the codeword assuming a signed fixed point approximation, the value of index s1 can be equal to −2, −1, 0 or 1. The value of index s0 is calculated based on the fourth and fifth bits of the codeword treated as an unsigned fixed point approximation, thus the variable s0 can have an integer value of 0, 1, 2, or 3. The values of {l, $h_0$, s0, s1} can be considered indexes and allow a sample-specific phase value to be mapped to an iso-phasor while being able to be unmapped later. In one embodiment, the set of 16 complex values, one in each sector, defined by each iso-phasor are given in Table 6.

In some embodiments, the Multiplier Unit 130 is arranged to operate on the iso-phasor index values {$h_0$} from the iso-phasor mapper and the sample from the digital signal x[n] 106 vector, provided by the bus 107, corresponding to the n value for the multiplier. The bus line may be a serial bus, parallel bus, a bus within a computer chip or other line providing sample data. The results of the multiplier operations will result in a set of complex numbers {$z_0, z_1, z_2, z_3$} corresponding to each of the iso-phasor index values provided from the iso-phasor mapper. In some embodiments, an iso-phasor index may correspond to multiple sample-specific phase values, as multiple sample-specific phase values may map to the same iso-phasor in the first sector. To calculate the set of complex numbers {$z_0, z_1, z_2, z_3$}, first an iso-phasor ($B_\theta$) is calculated for each unique iso-phasor index $h_0$. Based on each iso-phasor ($B_\theta$) two new variables are defined, $p_0 = \cos(2\pi\beta_0)$ and $q_0 = \sin(2\pi\beta_0)$. Additionally, the values of sample x[n] can be decomposed into real and imaginary components, x[n] = (a+jb), where j is defined as $\sqrt{-1}$. Moreover, a plus-minus function PMFun can be defined as PMFun(a,b)=[$S_+,S_-$]=[a+b, a−b]. For each pair of inputs in the plus-minus function, a and b, two outputs are generated, $S_+$ and $S_-$. The value of $S_+$ corresponds to a+b and $S_-$ corresponds to a−b.

TABLE 6

Iso-Phasor Mapping

| l | $h_l$ | $\beta_l = h_l 2^{-P_\theta}$ | $h_l$ | $\beta_l = h_l 2^{-P_\theta}$ | $c_l$ | $d_l$ |
|---|---|---|---|---|---|---|
| | | $\beta_0^{ISO}$ | | $\beta_{h_\theta}^{ISO}$ | | |
| −8 | −8$B_\theta$ | $-\frac{8}{16}$ | −8$B_\theta + h_0$ | $-\left(\frac{8}{16}\right) + \beta_0$ | $c_0$ | $d_0$ |
| −7 | −7$B_\theta$ | $-\frac{7}{16}$ | −6$B_\theta - h_0$ | $-\left(\frac{6}{16}\right) - \beta_0$ | $-c_1$ | $-d_1$ |
| −6 | −6$B_\theta$ | $-\frac{6}{16}$ | −6$B_\theta + h_0$ | $-\left(\frac{6}{16}\right) + \beta_0$ | $-c_2$ | $-d_2$ |
| −5 | −5$B_\theta$ | $-\frac{5}{16}$ | −4$B_\theta - h_0$ | $-\left(\frac{4}{16}\right) - \beta_0$ | $-c_3$ | $-d_3$ |
| −4 | −4$B_\theta$ | $-\frac{4}{16}$ | −4$B_\theta + h_0$ | $-\left(\frac{4}{16}\right) + \beta_0$ | $-d_0$ | $c_0$ |
| −3 | −3$B_\theta$ | $-\frac{3}{16}$ | −2$B_\theta - h_0$ | $-\left(\frac{2}{16}\right) - \beta_0$ | $-d_1$ | $c_1$ |
| −2 | −2$B_\theta$ | $-\frac{2}{16}$ | −2$B_\theta + h_0$ | $-\left(\frac{2}{16}\right) + \beta_0$ | $-d_2$ | $c_2$ |
| −1 | −1$B_\theta$ | $-\frac{1}{16}$ | $-h_0$ | $-\beta_0$ | $-d_3$ | $c_3$ |
| 0 | 0$B_\theta$ | 0 | $+h_0$ | $+\beta_0$ | $c_0$ | $d_0$ |
| 1 | 1$B_\theta$ | $+\frac{1}{16}$ | 2$B_\theta - h_0$ | $\left(\frac{2}{16}\right) - \beta_0$ | $c_1$ | $d_1$ |
| 2 | 2$B_\theta$ | $+\frac{2}{16}$ | 2$B_\theta + h_0$ | $\left(\frac{2}{16}\right) + \beta_0$ | $c_2$ | $d_2$ |
| 3 | 3$B_\theta$ | $+\frac{3}{16}$ | 4$B_\theta - h_0$ | $\left(\frac{4}{16}\right) - \beta_0$ | $c_3$ | $d_3$ |
| 4 | 4$B_\theta$ | $+\frac{4}{16}$ | 4$B_\theta + h_0$ | $\left(\frac{4}{16}\right) + \beta_0$ | $d_0$ | $-c_0$ |
| 5 | 5$B_\theta$ | $+\frac{5}{16}$ | 6$B_\theta - h_0$ | $\left(\frac{6}{16}\right) - \beta_0$ | $d_1$ | $-c_1$ |
| 6 | 6$B_\theta$ | $+\frac{6}{16}$ | 6$B_\theta + h_0$ | $\left(\frac{6}{16}\right) + \beta_0$ | $d_2$ | $-c_2$ |
| 7 | 7$B_\theta$ | $+\frac{7}{16}$ | 8$B_\theta - h_0$ | $\left(\frac{8}{16}\right) - \beta_0$ | $d_3$ | $-c_3$ |

In an embodiment, the Multiplier Unit 130 is configured to compute half the set of complex numbers {$z_0, z_1, z_2, z_3$} based on the following properties. The complex numbers can be defined as shown in Table 7. Each complex number contains a real portion, c, and an imaginary part, d.

TABLE 7

Complex Numbers Defined $z_0 = c_0 + jd_0$
$z_1 = c_1 + jd_1$

TABLE 7-continued

Complex Numbers Defined $z_2 = c_2 + jd_2$
$z_3 = c_3 + jd_3$

The expression below in Table 8 shows the calculation for the real and imaginary portions of $z_0$ and $z_3$. For $z_0$ and $z_3$ the real and imaginary parts—$c_0$, $d_0$, $c_3$, and $d_3$—are calculated separately. Once two of the z-values are completely calculated, the other two can be derived via a mathematical relationship. The expression for $W_1$ provides a phase offset for calculations taking place in a specific sector of phase plane. In the example calculation in Table 8, $W_0$ denotes the calculation is based on iso-vectors located the in sector 0, sector 0 being the sector containing the iso-phasor $\beta_0$.

For the example embodiment, calculations are performed in sector 0 since the expression for $W_0$ equals 1, and reduces the calculation of the real and imaginary components for complex numbers $z_1$ and $z_2$ to a plus-minus function rather than an exponential function combined with a plus-minus function. In some embodiments, the real and imaginary components for complex numbers $z_1$ and $z_2$ can be derived as shown in Table 8.

TABLE 8

Example Complex Number Calculation $x[n] = (a + jb)$
$p_0 = \cos(2\pi\beta_0)$
$q_0 = \sin(2\pi\beta_0)$
$[c_0, d_3] = \text{PMFun}(bq_0, ap_0)$
$[c_3, d_0] = \text{PMFun}(bp_0, aq_0)$
$W_0 = e^{-j2\pi\frac{0}{16}} = 1$
$r_0 = W_o c_0 = c_0$
$r_1 = W_o c_3 = c_3$
$i_0 = W_o d_0 = d_0$
$i_1 = W_o d_3 = d_3$
$[c_2, d_2] = \text{PMFun}(i_0, r_0)$
$[d_1, c_1] = \text{PMFun}(r_1, i_1)$ Thus, after the above manipulation, a full set of complex numbers $\{z_0, z_1, z_2, z_3\}$ can be calculated for each iso-phasor index. The exact equation for each of the example z-values for an example embodiment is given below. The multiplier is configured to output the four sets of complex numbers $\{z_0, z_1, z_2, z_3\}$ associated with each iso-phasor mapping defined by the iso-phasor index. In some examples, the four sets of complex numbers $\{z_0, z_1, z_2, z_3\}$ are defined as shown in Table 9.

TABLE 9

Example Complex Number Result $z_0 = bq_0 + ap_0 + j(bp_0 - aq_0)$
$z_1 = (bp_0 + aq_0 - bq_0 + ap_0) + j(bp_0 + aq_0 + bq_0 - ap_0)$
$z_2 = (bp_0 - aq_0 + bq_0 + ap_0) + j(bp_0 - aq_0 - bq_0 - ap_0)$
$z_3 = bp_0 + aq_0 + j(bq_0 - ap_0)$ In some embodiments, the unmapper unit 140 is configured to receive the four sets of complex numbers $\{z_0, z_1, z_2, z_3\}$ from the Multiplier Unit 130, and also configured to receive the iso-phasor index and the indexes $\{l, h_0, s0, s1\}$ from the iso-phasor mapper 120 via path 125. In some embodiment, the unmapper unit 140 utilizes a lookup table to convert the raw complex numbers $\{z_0, z_1, z_2, z_3\}$ and the indexes $\{l, h_0, s0, s1\}$ into real and imaginary components for each corresponding frequency. The unmapper unit 140 is not required to perform any mathematical operations, and can simply translate the four raw complex numbers $\{z_0, z_1, z_2, z_3\}$ into real and imaginary components for each corresponding frequency. An example of a lookup table that can be used by the unmapper unit 140 is seen in Table 10. Based on the values of the indexes $\{l, s1\}$ and the complex numbers, real and imaginary components can be obtained for each set of indices.

TABLE 10

Iso-Phasor Unmapping

| $l = (4 \cdot s1 + s0)$ | $s1$ | $c_l$ | $d_l$ | $\{c_l, d_l\}$ for $z_l = c_l + jd_l$ |
|---|---|---|---|---|
| $\{-8, -7, -6, -5\}$ | $-2$ | $-c_{s0}$ | $-d_{s0}$ | $z_{-8} = c_{-8} + jd_{-8} = -c_0 - jd_0$ |
| | | | | $z_{-7} = c_{-7} + jd_{-7} = -c_1 - jd_1$ |
| | | | | $z_{-6} = c_{-6} + jd_{-6} = -c_2 - jd_2$ |
| | | | | $z_{-5} = c_{-5} + jd_{-5} = -c_3 - jd_3$ |
| $\{-4, -3, -2, -1\}$ | $-1$ | $-d_{s0}$ | $c_{s0}$ | $z_{-4} = c_{-4} + jd_{-4} = -d_0 + jc_0$ |
| | | | | $z_{-3} = c_{-3} + jd_{-3} = -d_1 + jc_1$ |
| | | | | $z_{-2} = c_{-2} + jd_{-2} = -d_2 + jc_2$ |
| | | | | $z_{-1} = c_{-1} + jd_{-1} = -d_3 + jc_3$ |
| $\{0, 1, 2, 3\}$ | $0$ | $c_{s0}$ | $d_{s0}$ | $z_0 = c_0 + jd_0, z_1 = c_1 + jd_1,$ |
| | | | | $z_2 = c_2 + jd_2, z_3 = c_3 + jd_3$ |
| $\{4, 5, 6, 7\}$ | $1$ | $d_{s0}$ | $-c_{s0}$ | $z_4 = c_4 + jd_4 = d_0 - jc_0$ |
| | | | | $z_5 = c_5 + jd_5 = d_1 - jc_1$ |
| | | | | $z_6 = c_6 + jd_6 = d_2 - jc_2$ |
| | | | | $z_7 = c_7 + jd_7 = d_3 - jc_3$ |

In one embodiment, the unmapper unit 140 can be configured to process the complex numbers associated with an iso-phasor to unmap the $N_{des}+1$ sample-specific phase values. Each sample in the digital signal $x[n]$ 106 can be processed by the Multiplier Unit 130 to generates $N_{des}+1$ complex numbers, one for each rotation of the sample $x[n]$ with respect to the predetermined frequencies $\hat{f}$ from vector 104. The unmapper unit 140 is configured to output a complex vector of length $N_{des}+1$ the complex vector contains spectral samples of one sample of the digital signal $x[n]$ 106.

FIG. 2D is an example of different indices and vectors for an example data set used for spectral vector creation. For a sequence 292 and set of frequencies 293, a set of iso-phasor indices and a spectral vector are created. The objects 294, 296, and 298 of FIG. 2D show the iso-phasor indices and corresponding spectral sample vectors for n=1, 2, and 3 respectively. These three spectral sample vectors are indexed from one to In another example, consider the following parameters, $P_\theta=9$ and the sample value $(a+jb)=-0.12748+j0.1541$. Using the aforementioned procedures, and assuming $P_\theta+1$ bits, the indices $\{l, h_0, s0, s1\}$ can be determined by the iso-phasor mapper 120 for each r as shown in Table 11. The variable r counts on the number of desired frequencies from 0 to $N_{DES}$.

The variable $a[r]$ represents the floating point sample-specific phase value and $\hat{a}[r]$ represents the fixed point approximation for the sample-specific phase value. The codeword $C[r]$ is a signed $P_\theta+1$ bit representation of the fixed point approximation of the sample-specific phase value. The first four (4) bits of the codeword can be utilized to specify the index $l[r]$. The index $l[r]$ also corresponds to the sector of the 16 sectors in which the sample-specific phase value lies. The value of index $s1[r]$ is an integer value of the second and third bits of the codeword assuming a signed representation. Index $s0[r]$ is calculated based on the fourth and fifth bits of the codeword treated as an unsigned fixed point approximation. The index $h0[r]$, the iso-phasor index, can then be determined by converting the last bits of the codeword into an integer, assuming the bits are an unsigned fixed point approximation.

TABLE 11

Iso-Phasor Index Generation

| r | α[r] | α̂[r] | C[r] | l[r] | h₀[r] | s1[r] | s0[r] |
|---|------|-------|------|------|-------|-------|-------|
| 0 | −0.376 | −0.37695 | 1100111111 | −7 | 1 | −2 | 1 |
| 1 | −0.37549 | −0.375 | 1101000000 | −6 | 0 | −2 | 2 |
| 2 | −0.374 | −0.37305 | 1101000001 | −6 | 1 | −2 | 2 |
| 3 | −0.251 | −0.25195 | 1101111111 | −5 | 1 | −2 | 3 |
| 4 | −0.2451 | −0.24414 | 1110000011 | −4 | 3 | −1 | 0 |
| 5 | −0.1299 | −0.13086 | 1110111101 | −3 | 3 | −1 | 1 |
| 6 | −0.1201 | −0.11914 | 1111000011 | −2 | 3 | −1 | 2 |
| 7 | 0.11719 | 0.11719 | 0000111100 | 1 | 4 | 0 | 1 |
| 8 | 0.124 | 0.12305 | 0000111111 | 1 | 1 | 0 | 1 |
| 9 | 0.126 | 0.12695 | 0001000001 | 2 | 1 | 0 | 2 |
| 10 | 0.13281 | 0.13281 | 0001000100 | 2 | 4 | 0 | 2 |
| 11 | 0.24219 | 0.24219 | 0001111100 | 3 | 4 | 0 | 3 |
| 12 | 0.25049 | 0.25 | 0010000000 | 4 | 0 | 1 | 0 |
| 13 | 0.37451 | 0.375 | 0011000000 | 6 | 0 | 1 | 2 |

Table 11, shows there are four distinct values for the iso-phasor index $c = h_0[r]$, the values being $\{1, 0, 3, 4\}$. By grouping sample-specific phase values with a common iso-phasor index, the computations used are significantly reduced. Thus, only four sets of complex numbers are calculated to fully specify the real an imaginary components of the rotated values for the thirteen total sample-specific phase values of Table 11. Example sets of complex numbers are as follows below.

For $c = 1$ $z_0 \triangleq c_0 + j d_0 = -0.12558 + j 0.15566$;
$z_1 \triangleq c_1 + j d_1 = 0.01638 + j 0.19933$;
$z_2 \triangleq c_2 + j d_2 = 0.02126 + j 0.19887$;
$z_3 \triangleq c_3 + j d_3 = 0.15253 + j 0.12937$;
$\hat{y}[0] = z_{-7}, \hat{y}[2] = z_{-6}, \hat{y}[3] = z_{-5}, \hat{y}[8] = z_1, \hat{y}[9] = z_2$. for $c = 0$ $z_0 \triangleq c_0 + j d_0 = -0.12748 + j 0.1541$;
$z_1 \triangleq c_1 + j d_1 = -0.05881 + j 0.19116$;
$z_2 \triangleq c_2 + j d_2 = 0.01882 + j 0.19911$;
$z_3 \triangleq c_3 + j d_3 = 0.09359 + j 0.17675$;
$\hat{y}[1] = z_{-6}, \hat{y}[12] = z_4, \hat{y}[13] = z_6$. for $c = 3$ $z_0 \triangleq c_0 + j d_0 = -0.12173 + j 0.15869$;
$z_1 \triangleq c_1 + j d_1 = 0.01148 + j 0.19967$;
$z_2 \triangleq c_2 + j d_2 = 0.02614 + j 0.19828$;
$z_3 \triangleq c_3 + j d_3 = 0.14931 + j 0.13307$;
$\hat{y}[4] = z_{-4}, \hat{y}[5] = z_{-3}, \hat{y}[6] = z_{-2}$. and for $c = 4$.

$z_0 \triangleq c_0 + j d_0 = -0.11977 + j 0.16017$;
$z_1 \triangleq c_1 + j d_1 = 0.00903 + j 0.1998$;
$z_2 \triangleq c_2 + j d_2 = 0.02857 + j 0.19795$;
$z_3 \triangleq c_3 + j d_3 = 0.14766 + j 0.13489$;
$\hat{y}[7] = z_1, \hat{y}[10] = z_2, \hat{y}[11] = z_3$.

Based on the sets of complex numbers, real and imaginary components of the rotated sample can be computed by the unmapper unit 140. The unmapper unit 140 can use a lookup table similar to Table 10 to calculate the rotated values. The rotated values from the unmapper unit 140 are given in Table 12.

TABLE 12

Unmapped Values

| r | l[r] | s1[r] | s0[r] | $y_R[r]$ | $\hat{y}_R[r]$ | $y_I[r]$ | $\hat{y}_I[r]$ |
|---|------|-------|-------|----------|----------------|----------|----------------|
| 0 | −7 | −2 | 1 | −0.01757 | −0.01638 | −0.19923 | −0.19933 |
| 1 | −6 | −2 | 2 | −0.01821 | −0.01882 | −0.19917 | −0.19911 |
| 2 | −6 | −2 | 2 | −0.02007 | −0.02126 | −0.19899 | −0.19887 |
| 3 | −5 | −2 | 3 | −0.1533 | −0.15253 | −0.12845 | −0.12937 |
| 4 | −4 | −1 | 0 | −0.15795 | −0.15869 | −0.12268 | −0.12173 |
| 5 | −3 | −1 | 1 | −0.1996 | −0.19967 | 0.01268 | 0.01148 |
| 6 | −2 | −1 | 2 | −0.19844 | −0.19828 | 0.02494 | 0.02614 |
| 7 | 1 | 0 | 1 | 0.00903 | 0.00903 | 0.1998 | 0.1998 |
| 8 | 1 | 0 | 1 | 0.01757 | 0.01638 | 0.19923 | 0.19933 |
| 9 | 2 | 0 | 2 | 0.02007 | 0.02126 | 0.19899 | 0.19887 |
| 10 | 2 | 0 | 2 | 0.02857 | 0.02857 | 0.19795 | 0.19795 |
| 11 | 3 | 0 | 3 | 0.14766 | 0.14766 | 0.13489 | 0.13489 |
| 12 | 4 | 1 | 0 | 0.15449 | 0.1541 | 0.12701 | 0.12748 |
| 13 | 6 | 1 | 2 | 0.19917 | 0.19911 | −0.01821 | −0.01882 |

In one embodiment, there is one unmapper unit 140 for each sample of x[n], totaling $L_x + 1$ unmapper units 140. The summer unit 150 receives a complex vector of length $N_{des} + 1$ from each unmapper in apparatus 100. The summer unit 150 is configured to perform a summation across all $L_x + 1$ complex vectors to form a complex vector Y 108 with a length $N_{des} + 1$. In some embodiments each row of the complex vector Y 108 corresponds to a spectral sample of the digital signal x[n] 106, each spectral sample being measured at each frequency in the set of predetermined frequencies $\hat{f}$ from vector 104.

Figure 2A:
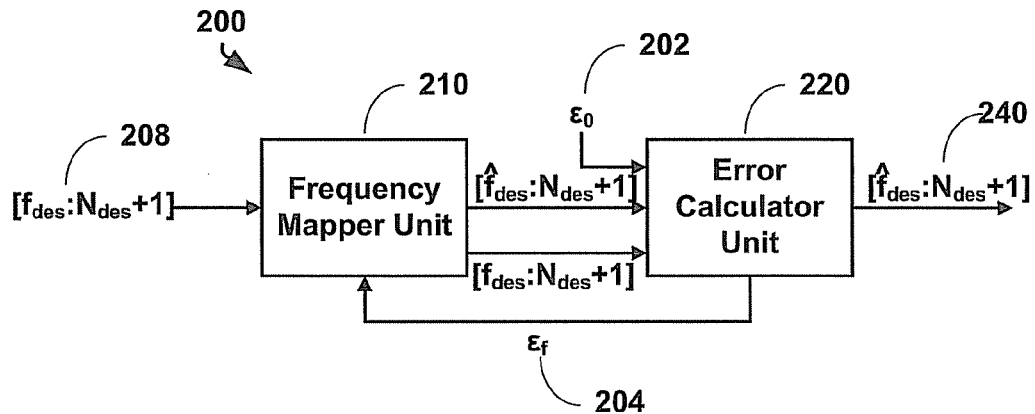
FIG. 2A is a functional block diagram of one embodiment of a method for generating a set of frequencies from a desired set of frequencies.

FIG. 2A is a functional block diagram of one embodiment of a method for, generating a set of frequencies from a desired set of frequencies and shows an apparatus 200 that is configured to map a first vector 208 containing a set of frequencies to a second vector 240 containing a second set of frequencies based upon quantization in accordance with various techniques described herein. A further illustration of frequency mapping for apparatus 200 is given in Table 13.

TABLE 13

Frequency Mapping

| x[0] | x[1] | ... | ... | .. | x[$L_x - 1$] |
|------|------|-----|-----|----|--------------|
| 0 | ... | ... | ... | .. | ($L_x - 1$) |

→ n

| $f_{VEC}[0]$ | $f_{VEC}[1]$ | ... | $f_{VEC}[M_f]$ | ... | .. | $f_{VEC}[N_f - 1]$ |

→ f

| $-\left(\frac{1}{2}\right)$ | ... | ... | 0 | ... | .. | $\left\{\left(\frac{1}{2}\right) - \Delta_f\right\}$ |

| $f_{VEC}[0]$ | $f_{VEC}[1]$ | | $f_{VEC}[M_f]$ | | | $f_{VEC}[N_f - 1]$ |
| $k_{VEC}[0]$ | $k_{VEC}[1]$ | ... | $k_{VEC}[M_f]$ | ... | .. | $k_{VEC}[N_f - 1]$ |

→ i

| 0 | ... | ... | $M_f$ | | .. | ($N_f - 1$) |

| $f_{DES}[0]$ | $f_{DES}[1]$ | ... | | | | $f_{DES}[N_{DES}]$ |

→ f

| $-\left(\frac{1}{2}\right)$ | | | | | | $\left(\frac{1}{2}\right)$ |

| $k_{DES}[0]$ | $k_{DES}[1]$ | ... | | | | $k_{DES}[N_{DES}]$ |

→ $\left(\frac{f}{\Delta_f}\right)$

| $-\left(\frac{1}{2\Delta_f}\right)$ | | | | | | $\left(\frac{1}{2\Delta_f}\right)$ |

| $i_{DES}[0]$ | $i_{DES}[1]$ | | | | | $i_{DES}[N_{DES}]$ |
| $\hat{k}_{DES}[0]$ | $\hat{k}_{DES}[1]$ | ... | | | .. | $\hat{k}_{DES}[N_{DES}]$ |

→ r

| 0 | ... | ... | ... | .. | ($N_{DES}$) |

| $\hat{f}_{DES}[0]$ | $\hat{f}_{DES}[1]$ | ... | | | | $\hat{f}_{DES}[N_{DES}]$ |

→ f

| $-\left(\frac{1}{2}\right)$ | | ... | ... | | | $\left(\frac{1}{2}\right)$ |

In another embodiment, the frequency mapper unit 210 is configured to receive as an input a vector $f_{des}$ 208 containing a set of $N_{des}+1$ desired frequencies. The frequency mapper unit 210 is configured to calculate the difference between the desired frequencies in the vector and, in an embodiment, the result can be referred to as $\delta_{DES}$. The frequency mapper unit 210 can be configured to find the smallest value of result $\delta_{DES}$, which can be referred to as $\Delta_{DES}$. For example, a non-uniformly spaced vector $[f_{DES}:N_{DES}]=\{-0.36,-0.27,0.1247, 0.1255\}$ can be utilized to compute the frequency separations $[\delta_{DES}:N_{DES}]=\{-0.36,0.0900,0.3947,0.0008\}$, which in this example has a resulting value of $\Delta_{DES}=0.0008$. The calculated value of $\Delta_{DES}$ corresponds to $\Delta_{DES}=2^{-10.2877}>2^{-11}$, where the integer exponent can be referred to as a scaling factor, $P_f$. The value of $p_f+1$ corresponds to the number of bits used to store each sample of $f_{DES}$, where in this example 12 bits are required.

The frequency mapper unit 210 calculates a scaling factor with the equation $\Delta f=2^{-P_f}$, where $\Delta f$ is a spectral sampling resolution. Based on the scaling factor, a spectral model order, $N_f$, is calculated via the following equation $N_f=2^{P_f}$. The spectral model order $N_f$ can be multiplied by the input vector $f_{des}$ 208 vector to create a $k_{des}$ vector containing a scaled set of frequencies, the $k_{des}$ vector is used within the frequency mapper unit 210. Through a non-linear operation, the scaled set of frequencies vector can be rounded up or down by the frequency mapper unit 210 to obtain integer values in the, scaled-approximation $\hat{k}_{des}$ vector. An approximation for the input vector $f_{des}$ 208 can be created by the following equation $\hat{f}_{des}=\hat{k}_{des}/N_f$. The vector $\hat{f}_{des}$ is an approximation of vector $f_{des}$, but it can be approximated with quantizable numbers. The frequency mapper unit 210 can be configured to output both vectors $f_{des}$ and $\hat{f}_{des}$ to the error calculator unit 220.

For example, uniformly spaced samples can be calculated by the frequency mapper unit 210. For a spectral model order of 8, $N_f=8$, the spectral sampling resolution value can be calculated, $\Delta f=2^{-3}=0.125$, by the frequency mapper unit 210. The example scaled frequency vector, $k_{vec}$, is equal to $[k_{VEC}:N_{VEC}]=\{-4,-3,-2,-1,0, 1, 2, 3\}$ and by the relationship $f_{VEC}[i]=k_{VEC}[i]\Delta f$ producing the unscaled vector, $f_{VEC}=\{-0.5,-0.375,-0.25,-0.125,0.125,0.25,0.357\}$. The resulting unscaled sequence has a maximum frequency separation of $$\delta_{VEC}[0] = -\left(\frac{1}{2}\right)$$

and a minimum frequency spacing equal to $\delta_{VEC}[i]=0.125$ when $1\leq i<7$. Since $P_f=3$, only 4 bits are needed ($P_f+1$) to store frequency information.

In some embodiments, the error calculator unit 220 is configured to receive two vectors $f_{des}$ and $\hat{f}_{des}$ as well as a predetermined maximum acceptable error factor $\epsilon_{max}$ 202, which may also be referred to as a threshold, error threshold, or acceptable error threshold. The error calculator unit 220 can be configured to perform an analysis on the two vectors to see how close the approximation is to the input frequencies.

The error calculator can also be configured to compute an error $E_F$ based on a comparison of vectors $f_{des}$ and $\hat{k}_{des}$ at each index of the vectors, where the error $E_F$ can be given as $E_F=\max|\hat{f}_{des}[r]-f_{des}[r]|$. In some embodiments error $E_F$ can be converted by the error calculator unit 220 to an error factor $\epsilon_F=\lfloor\log_2(E_F)\rfloor$. If the calculated error factor $E_F$ is less than the maximum acceptable error factor $\epsilon_{max}$, an error 204 is returned from the error calculator unit 220 to the frequency mapper unit 210.

The frequency mapper unit 210 is configured to process the maximum acceptable error factor $\epsilon_{max}$ and may responsively increase or decrease the spectral model order and compute a new approximation set for vector $\hat{f}_{des}$ until the calculated error factor $\epsilon_F$ is more than or equal to the maximum acceptable error factor $\epsilon_{max}$, at which point the error calculator unit 220 can output vector $\hat{f}_{des}$ 240.

FIG. 2C is an example of the mapping of a desired set of frequencies to a set of available frequencies for different bit lengths. The mapping can be performed by the frequency mapper unit 210 unit is shown in Example 270. In this example, a frequency sequence 271 is mapped to various vectors $\hat{f}_{des}$ based on increasing the $P_f$ 274. The value for $P_f$ is either 9, 10, 11 or 14 for the examples. As the value of $P_f$ 274 increases, so does the calculated error factor $\epsilon_F$ 272, thus as more bits are used a more accurate estimation may result.

When looking at Example 270, one can see the frequencies cannot be resolved when $P_f=9$, as $\delta_{DES}$ 282 has a 0 for a frequency separation. When $P_f=10$ no values of $\delta_{DES}$ are equal to 0 and all frequencies can be uniquely quantized. Therefore 11 bits may be required for this frequency resolution. The apparatus and associated method can be used with apparatus 100 and methods 300 and 400 to map the desired frequencies to quantizable frequencies, while maintaining confidence that the frequencies are close to desired.

By altering the spacing of frequencies with the frequency mapper 210, the spacing of the iso-phasors is also varied. By increasing the frequency resolution, the spacing between iso-phasors is decreased, and proportionally the number of bits for quantization increases. The value calculated for the integer exponent $P_F$ calculated in the frequency mapper unit 210 can also be related to the number of quantization bits used to in the codeword generated by the iso-phasor mapper 120, as $P_F+1$ bits are used to store the value of the normalized phase.

Another embodiment of mapping frequencies is for each spectral query of $[x:(L_x+1)]$, the vector $f_{des}$ can be mapped to vector $\hat{f}_{des}$, which may be called the predetermined frequencies, based on the spectral model order, $N_f\geq(L_x+1)$. The sequence $[\delta_{des}:(N_{des}+1)]$ is computed by finding the difference between adjacent samples of $[f_{des}:(N_{des}+1)]$. The spectral model order can be calculated based on $N_f=2^{P_f}$, which defines the representable set of frequencies in $\hat{f}_{des}\{S0, P_f\}$. The sequence $[k_{des}:(N_{des}+1)]$ can be computed by $k_{des}[r]=f_{des}[r]N_f$. An approximation to $k_{des}$ is obtained with a non-linear operation, for example rounding up or down to the next integer value of $k_{des}[r]$, resulting in $[\hat{k}_{des}:(N_{des}+1)]$. For indices r in a range given by $0\leq r\leq N_{des}$, the value of vector $\hat{k}_{des}[r]=k_{vec}[i_{des}[r]]$ is an integer, where $i_{des}$ is a variable representing a sequence of non-negative numbers. The approximation frequency vector, $[\hat{f}_{des}:(N_{des}+1)]$, is obtained by dividing the scaled approximation vector by the spectral model order, $$\hat{f}_{des}[r] = \frac{\hat{k}_{des}[r]}{N_f}.$$

An error parameter, $\epsilon_f$, is computed based on the approximation frequency vector $\hat{f}_{des}$ and the desired frequency vector $f_{des}$. If $\epsilon_f<\epsilon_{max}$, the process is repeated after the scaling factor $P_f$ has been increased. If $\epsilon_f\geq\epsilon_{max}$, the computation can continue, or the scaling factor $p_f$ can be increased based on a maximum complexity of the desired DTFT.

The spectral samples can be calculated once a scaling factor value is chosen and also found to have an acceptable error. For n=0, set $\hat{y}[r,0]=x[0]$; $\hat{Y}=\hat{Y}_0$; and $\hat{\alpha}[r,0]=0$. Update n=(n+1) and compute a parameter $\hat{\alpha}[r, n]=\text{npmod}(\hat{\alpha}[r,n-1]+$ $f_{vec}[i_{des}[r]])$, this parameter may be called the sample-specific phase value. Compute the elements of $\{\hat{y}[r,n]\}$ of $\hat{Y}_N$ using the principles disclosed. Update $\hat{Y}=\hat{Y}+\hat{Y}_n$ and if $n \leq L_X$ and repeat the procedure starting with update $n=(n+1)$. If $n>L_X$ the $\hat{Y}$ vector, also known as the spectral sample vector, contains spectral sample estimates for Y.

In another embodiment, the following procedure can be used to calculate spectral samples.

1) A spectral model order $N_f=2^{P_f}$ is chosen which maps $[f_{des}:(N_{des}+1)]$ to $[\hat{f}_{des}:(N_{des}+1)]$ for an acceptable error threshold $\epsilon_0$.
2) For $n=0$ set $\hat{y}[r,0]=x[0]$; $\hat{Y}=\hat{Y}_0$; and $\hat{\alpha}[r,0]=0$.
3) Update $n=(n+1)$.
4) Compute a parameter $\hat{\alpha}[r,n]=npmod\,(\hat{\alpha}[r,n-1]+f_{vec}[i_{des}[r]])$.
5) Compute the elements of $\{\hat{y}[r,n]\}$ of $\hat{Y}_N$ using the principles disclosed in this specification.
6) Update $\hat{Y}=\hat{Y}+\hat{Y}_n$.
7) If $n \leq L_X$ and repeat the procedure starting with the step 3 above.
8) If $n>L_X$ the $\hat{Y}$ vector, also known as the spectral sample vector, contains spectral sample estimates for Y.

Figure 2B:
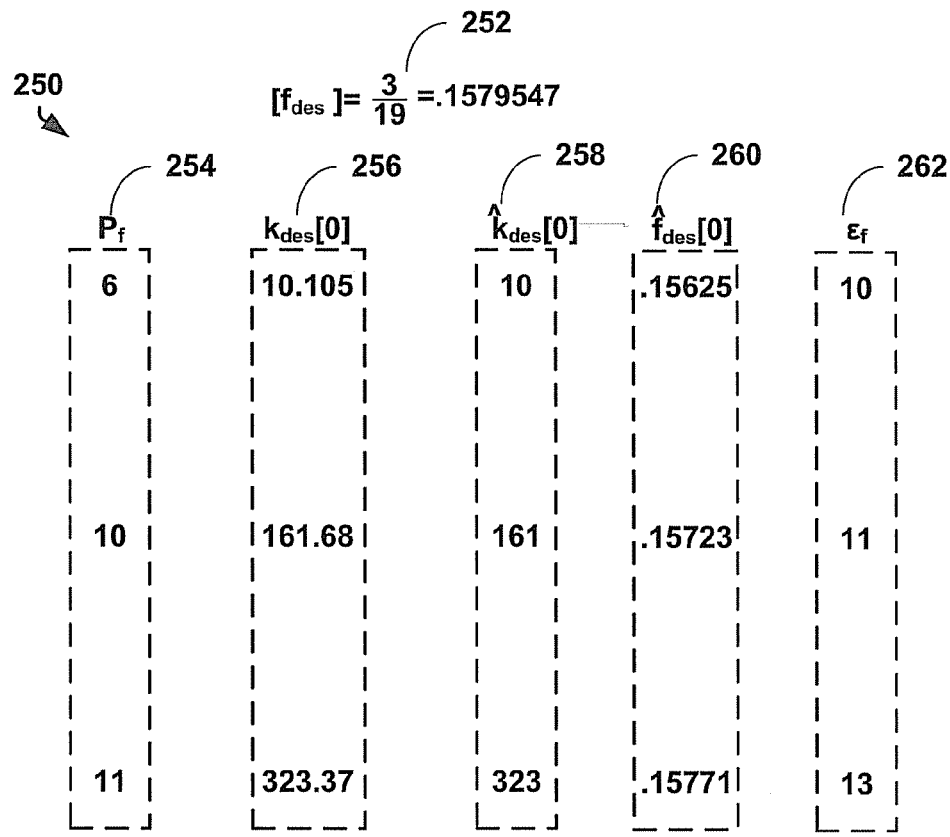
FIG. 2B is an example of the mapping of a desired set of frequencies to a set of available frequencies.

FIG. 2B is an example of the mapping of a desired set of frequencies to a set of available frequencies and presents example 250 operating on hardware similar to apparatus 200. A desired frequency 252 is given by $3/19$. Different integer exponent $P_F$ levels 254 are chosen, in this example they are $\{6, 10, 11\}$. The vector $f_{des}$ maps to vector $k_{des}$ 256 $\{10.105, 161.68, 323.37\}$ for the respective chosen values of integer exponent $P_F$ and through a non-linear rounding operation, vector $\hat{k}_{des}$ 258 is found resulting in $\{10, 161, 323\}$, respectively. The value for vector $\hat{k}_{des}$ can be mapped to vector $\hat{f}_{des}$ 260 resulting in $\{0.15625, 0.15723, 0.15771\}$, these frequencies approximating $f_{des}$ 252. For each value of vector $\hat{f}_{des}$ an associated error can be calculated, $\epsilon_F$ 262. This example shows that as integer exponent $P_F$ increases, the accuracy of the estimate may increase.

Figure 3:
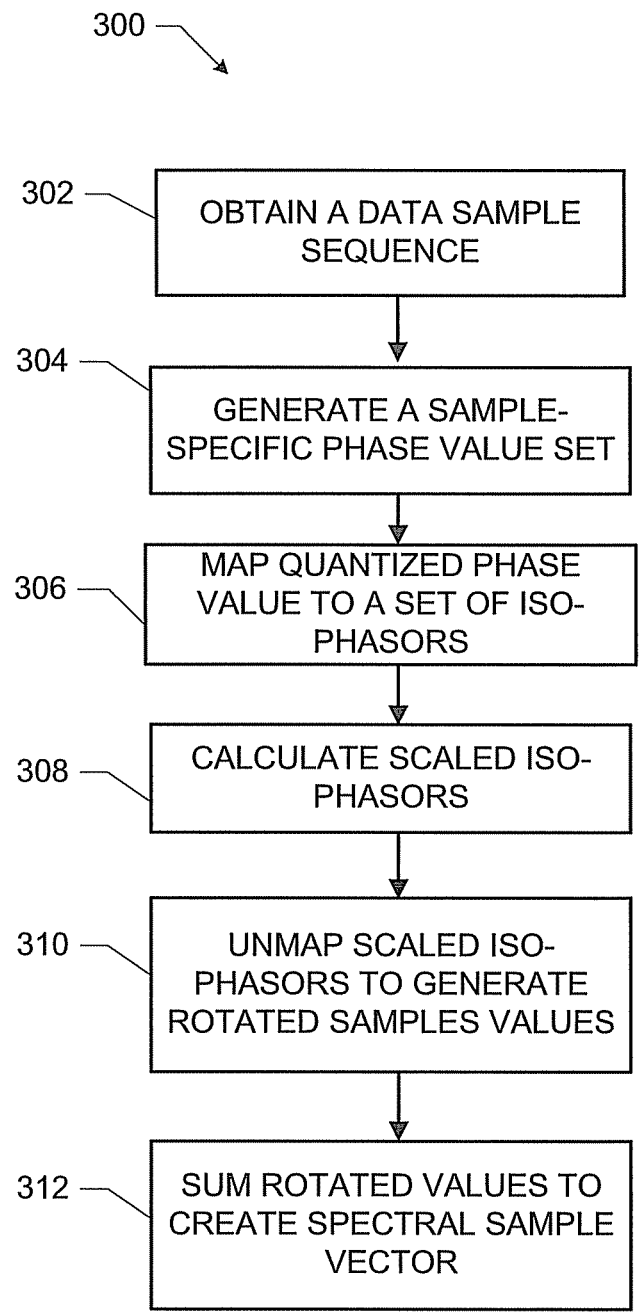
FIG. 3 is a functional block diagram of one embodiment of a method for generating spectral samples of a finite length discrete sequence.

FIG. 3 is a functional block diagram of one embodiment of a method for generating spectral samples of a finite length discrete sequence in accordance with at least some embodiments described herein. In some examples, FIG. 3 may represent a method 300 that for example could be used with the apparatus 100. Method 300 may include one or more operations, functions or actions as illustrated by one or more of blocks 302, 304, 306, 308, 310, and/or 312. Although the blocks are illustrated in a sequential order, these blocks may also be performed in parallel, and/or in a different order than those described herein. Also, the various blocks may be combined into fewer blocks, divided into additional blocks, and/or eliminated based upon the desired implementation.

Processing for method 300 may begin at block 302, "OBTAIN A DATA SAMPLE SEQUENCE." In some examples, block 302, may comprise obtaining a data sample sequence with the bus line 107 of FIG. 1. The data sequence may be associated with a digital signal or an analog signal, where the digital signal may correspond to an analog signal that is digitized with an analog to digital converter. The data sequence obtained may also be sampled with respect to time. A digital data sequence can be sampled at discrete times and may contain $L_x+1$ samples, each sample indexed in time.

Block 302 may be followed by block 304, "GENERATE SAMPLE-SPECIFIC PHASE VALUE SET." In some embodiments, block 304 may comprise generating a sample-specific phase value set with the Phase Rotation Set Generator 110 of FIG. 1. The sample specific desired phase values can be based on the digital data sequence with the $L_x+1$ samples and a set of predetermined frequencies, containing $N_{des}+1$ number of frequencies. Therefore, in some embodiments, a total of $N_{des}+1$ times $L_x+1$ sample-specific phase values can be generated. Each sample-specific phase value can be generated based on a desired frequency and the index associated with a specific sample in the digitized sequence. When the frequency is multiplied by the index, this result is divided by two pi, and the modulo $-1$ operator can be performed to have a number that falls in a range of about $-\frac{1}{2}$ to about $+\frac{1}{2}$. Each sample-specific phase value can then mapped by the Phase Rotation Set Generator 110 to a quantized phase value based upon a pre-defined resolution.

Block 304 may be followed by block 306, "MAP QUANTIZED PHASE VALUE TO SET OF ISO-PHASORS." In some embodiments, block 306 may comprise mapping each quantized phase value to a set of Iso-phasors at element 306 with an Iso-phasor Mapper 120 of FIG. 1, wherein each sample of the quantized sequence has a corresponding set of iso-phasors. An iso-phasor is a quantized phase value falling within the first sector of a normalized phase plane. In some embodiments, the phase plane can be divided into 16 equal sectors. A single iso-phasor in the first sector may have multiple quantized phase values assigned to it. The mapping to iso-phasors can be approximated as the virtual folding of the phase plane. By folding the phase plane in half 8 times, as in this example, the full plane can be mapped to a single sector. Along with the mapping, a set of index values can be created for each quantized phase value, the index values will allow the iso-phasors to be unmapped later.

Block 306 may be followed by block 308, "CALCULATE SCALED ISO-PHASORS." In some embodiments, block 308 may comprise calculating scaled iso-phasors with a Multiplier Unit 130 of FIG. 1, where the scaled iso-phasors correspond to an altered iso-phasor set. The Multiplier Unit 130 can be configured to multiply each set of iso-phasors by the value of the sample associated with the set, producing a scaled set of iso-phasors.

Block 308 may be followed by block 310, "UNMAP SCALED ISO-PHASORS TO GENERATE ROTATED SAMPLES VALUES" In some embodiments, block 310 may comprise generating rotated sample values by unmapping the scaled iso-phasors with an Unmapper Unit 140 of FIG. 1. The iso-phasors can be unmapped to create rotated sample values. By using the scaled iso-phasors and the associated indexes to unmap the iso-phasors, each quantized phase value has been scaled and rotated for each frequency in the set of predetermined frequencies. The unmapping procedure can be performed on all the iso-phasors using the index data. The scaled and rotated information can be in the form of a complex number, where the complex numbers can be formed into one column vector for each sample. Each entry in the vector may correspond to one frequency in the set of predetermined frequencies. As summarized in Mapping Indices Table 13, the various calculations preformed (e.g., by an Unmapper Unit 140 unit) are functions of both the sample index and the frequency index.

TABLE 13

| | | | Mapping Indices | | | |
|---|---|---|---|---|---|---|
| r | $\hat{\alpha}[r, n]$ | l[r, n] | $h_0[r, n]$ | s1[r, n] | s0[r, n] | $\hat{y}[r, n]$ |
| 0 | $\hat{\alpha}[0, n]$ | l[0, n] | $h_0[0, n]$ | s1[0, n] | s0[0, n] | $\hat{y}[0, n]$ |
| 1 | $\hat{\alpha}[1, n]$ | l[1, n] | $h_0[1, n]$ | s1[1, n] | s0[1, n] | $\hat{y}[1, n]$ |
| ... | ... | ... | ... | ... | ... | ... |
| $N_{DES}$ | ... | ... | ... | ... | ... | ... |

Block 310 may be followed by block 312, "SUM ROTATED VALUES TO CREATE SPECTRAL SAMPLE VECTOR." In some embodiments, block 312 may comprise summing selected rotated values to create a spectral sample vector with a Summer unit 150 of FIG. 1. The vectors are summed to create the spectral samples. The summing of the vectors creates a vector of length $N_{des}+1$. Each entry in the summed vector corresponds to a spectral sample of the sequence at a desired frequency. A mathematical explanation of method 300 can be seen in Table 14.

TABLE 14

Mathematical Representation $$X(f_{DES}[r]) \approx X(\hat{f}_{DES}[r]) = X(\hat{k}_{DES}[r]\Delta_f) = \sum_{n=0}^{L_X} x[n]w[r, n]$$

where $w[r, n] \triangleq e^{j2\pi\alpha[r, n]}$,
$\alpha[r, n] \triangleq \text{npmod}(f_{VEC}[i_{DES}[r, n]]n)$
For $0 \leq r \leq N_{DES}$.
$X(\hat{f}_{DES}[0]) = x[0]w[0, 0] + x[1]w[0, 1] + \ldots + x[L_x]w[0, L_x]$;
$X(\hat{f}_{DES}[1]) = x[0]w[1, 0] + x[1]w[1, 1] + \ldots + x[L_x]w[1, L_x]$;
$X(\hat{f}_{DES}[r]) = x[0]w[r, 0] + x[1]w[r, 1] + \ldots + x[L_x]w[r, L_x]$;
For $Y \triangleq [X(\hat{f}_{DES}[0]), X(\hat{f}_{DES}[1]), \ldots, X(\hat{f}_{DES}[N_{DES}])]^T$
$W_{*n} \triangleq [w[0, n], w[1, n], \ldots, w[N_{DES}, n]]^T$;
$W \triangleq [W_{*0}, W_{*1}, \ldots, W_{*L_X}]$;
$Y = x[0]W_{*0} + x[1]W_{*1} + \ldots + x[L_X]W_{*L_X}$
Y is a linear combination of the vectors $\{W_{*n}\}$.
For $x[n] \triangleq x_R[n] + jx_I[n]$,
$y[r, n] \triangleq x[n]w[r, n] = y_R[r, n] + jy_I[r, n]$;
$Y_N = [y[0, n], \ldots, y[N_{DES}, n]]^T = x[n]W_{*n}$;
$Y = (Y_0 + Y_1 + \ldots + Y_{L_X})$
Recursion of $\alpha[r, n]$:
$\alpha[r, n] \triangleq \text{npmod}(\alpha[r, n-1] + f_{VEC}[i_{DES}[r]])$
Special Case(U-Sampling): When $f_{DES}[r] = f_{VEC}[r]$. $P_{DES} = P_f$,
$i_{DES}[r] = r$, $w[r, n] = e^{-j2\pi f_{VEC}[r]n}$ and hence $X(f_{DES}[r]) = X^{DFT}[r]$.

Figure 4:
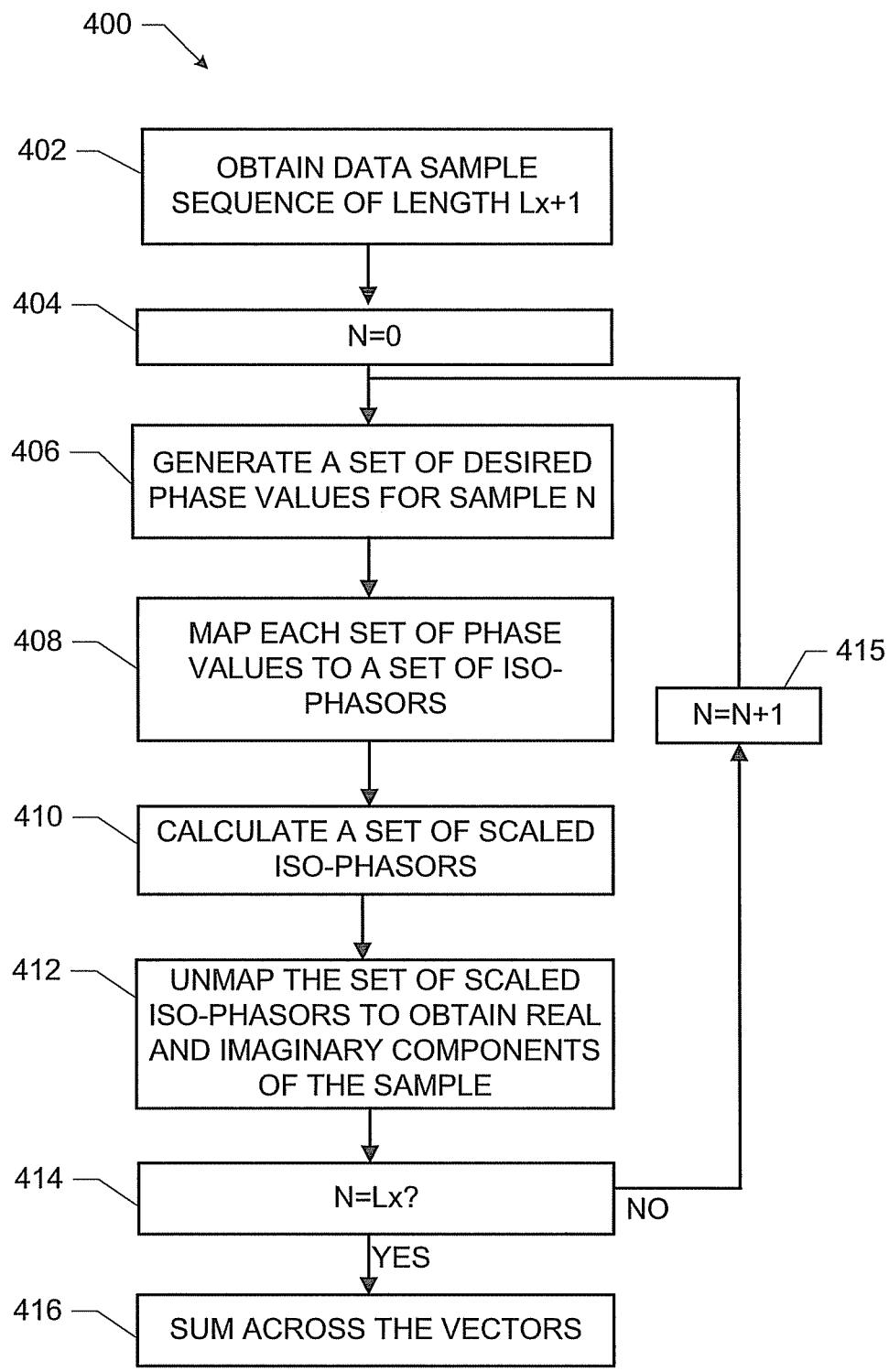
FIG. 4 is a functional block diagram of one embodiment of a method for generating spectral samples of a finite length discrete sequence.

FIG. 4 is a functional block diagram of one embodiment of a method for generating spectral samples of a finite length discrete sequence, in accordance with at least some embodiments described herein. In some examples, method 400 shown in FIG. 4 presents an alternate embodiment of a method that for example could be used with the apparatus 100. Method 400 may include one or more operations, functions or actions as illustrated by one or more of blocks 402, 404, 406, 408, 410, 412, 414, 415, and/or 416. Although the blocks are illustrated in a sequential order, these blocks may also be performed in parallel, and/or in a different order than those described herein. Also, the various blocks may be combined into fewer blocks, divided into additional blocks, and/or eliminated based upon the desired implementation.

Processing for method 400 may begin at block 402, "OBTAIN DATA SAMPLE SEQUENCE OF LENGTH Lx+1." In some examples of block 402 a digital data sequence is obtained. The data sequence obtained may also be sampled with respect to time. A digital data sequence can be sampled at discrete times and may contain $L_x+1$ samples, with an index value n associated with the sample time.

Block 404 sets a variable N equal to 0. Block 402 may be followed by block 404, "N=0". This variable is used to denote which sample in the data sample sequence is currently being operated upon. Block 404 may be followed by block 406, "GENERATE A SET OF DESIRED PHASE VALUES FOR SAMPLE N". The sample specific desired phase values can be generated by a Phase Rotation Set Generator 110 of FIG. 1 based on the index N and a set of predetermined frequencies, containing $N_{des}+1$ number of frequencies. Therefore, in this embodiment, a total of $N_{des}+1$ sample-specific phase values are generated. Each sample-specific phase value is generated based on a desired frequency and the index N associated with a specific sample in the digitized sequence. When the desired frequency is multiplied by the index, this result is divided by two pi, and the modulo −1 operator is performed to have a number that falls between −½ and ½. Each sample-specific phase value is then mapped to a quantized phase value based upon a pre-defined resolution.

Block 406 may be followed by block 408, "MAP EACH SET OF PHASE VALUES TO A SET OF ISO-PHASORS." At block 408, each quantized phase value can be mapped to a set of iso-phasors. In some examples, the iso-phasor may be mapped by iso-phaor Mapper 120 of FIG. 1. An iso-phasor is a quantized phase value falling within the first sector of a normalized phase plane having an associate phase value from each sector on the plane. In this embodiment, the phase plane is divided into 16 equal sectors. A single iso-phasor in the first sector may have multiple quantized phase values assigned to it. Iso-phasor mapping may be the virtual folding of the phase plane. By folding the phase plane in half 8 times, the full plane can be mapped to a single sector. Along with the mapping, a set of index values are created for each quantized phase value, the index values will allow the iso-phasors to be unmapped later.

Block 408 may be followed by block 410, "CALCULATE A SET OF SCALED ISO-PHASORS." At block 410, the set of iso-phasors can be mapped to an altered iso-phasor set. In some examples, the scaled iso-phasor set may be mapped by Multiplier Unit 130 of FIG. 1. Each set of iso-phasor is multiplied by the value of the sample at index N, producing a scaled set of iso-phasors.

Block 410 may be followed by block 412, "UNMAP THE SET OF SCALED ISO-PHASORS TO OBTAIN REAL AND IMAGINARY COMPONENTS OF THE SAMPLE." At block 412, the altered iso-phasors can be unmapped to create rotated sample values. In some examples, the unmapping may be performed by Unmapper Unit 140 of FIG. 1. By using the scaled iso-phasors and the associated indexes to unmap the iso-phasors, each quantized phase value has been scaled and rotated for each frequency in the set of predetermined frequencies. The unmapping procedure is performed on all the iso-phasors using the index data. The scaled and rotated information is in the form of a complex number, the complex numbers are formed into one column vector for each sample. Each entry in the vector corresponds to one frequency in the set of predetermined frequencies.

Block 412 may be followed by block 414, "N=Lx?" At block 412, the variable N is compared with the length of the sequence Lx. If N is equal to Lx, then block 414 may be followed by block 416. Otherwise, if N is not equal to Lx, block 414 may be followed by block 415. In some examples, the comparison of the variable N to the length of sequence Lx is performed by Multiplier Unit 130 of FIG. 1. At block 415, the variable N is increased by 1. Block 406 may be followed by block 415, "N=N+1" and blocks 406, 408, 410, 412, and 414 are performed again where Block 406 may be followed by block 408, "MAP EACH SET OF PHASE VALUES TO A SET OF ISO-PHASORS," Block 408 may be followed by block 410, "CALCULATE A SET OF SCALED ISO-PHASORS," Block 410 may be followed by block 412, "UNMAP THE SET OF SCALED ISO-PHASORS TO OBTAIN REAL AND IMAGINARY COMPONENTS OF THE SAMPLE," and Block 412 may be followed by block 414, "N=Lx?" This method may be performed iteratively and may continue until N has been increase to the value of $L_X$.

Block 414 may be followed by block 416, "SUM ACROSS THE VECTORS." At block 414, the Lx+1 vectors can be summed to create the spectral samples. The summing of the vectors can be performed by Summer Unit 150 of FIG. 1. The summing operation creates a vector of length $N_{des}+1$. Each entry in the summed vector corresponds to a spectral sample of the sequence at a desired frequency.

FIG. 5 is an example normalized phase plane and the mapping of iso-phasors, in accordance with at least some embodiments described herein. FIG. 5 presents one embodiment of the phase plane 510, indices 512, and iso-phasors 514. The arrowed lines in 510 show the boundaries of the 16 sectors used in an embodiment of the various apparatuses and methods.

The darkened dots on the outer ring of the phase plot correspond to sample-specific phase values that will all map to the same iso-phasor, $\beta_0$ in the first sector. If the phase plane was folded along each solid line, all the darkened dots would align on the iso-phasor $\beta_0$. Each circle on the phase plane corresponds to one possible phase value, each circle being defined by its own codeword. The index value found next to each $\beta$ on the phase plot corresponds to the l index associated with any phases in that given sector. For example, $\beta_3$ lies in a sector corresponding to all phases having an l value equal to 3.

Additionally, item 512 details how various codewords related to the phase plane 510. For example the codeword $C_0$ is the first four bits of the string and the codeword $C_1$ is the fourth bit through the last bit. The codeword $C_0$ corresponds to the index l for each phase, when $C_0$ is treated as a signed approximation. In one embodiment, the iso-phase index can also be determined from this codeword as shown in 512.

Chart 514 of FIG. 5 presents an embodiment of the calculation of indices for the phase plane. The indices relate the codeword to the associated iso-phase index $h_0$ in the sector l, specified by the codeword. Chart 516 defines the term iso-phasor. An iso-phasor is a 16-dimensional column vector specifying 16-phasors based on one phase value. In the phase plane 510, the darkened circles not on the arrowed lines define a single iso-phasor with an $h_0$ value equal to 3. By specifying this one iso-phasor, the rotated values can easily be computed for any of the 16 phasors specified by the iso-phasor.

Figure 6:
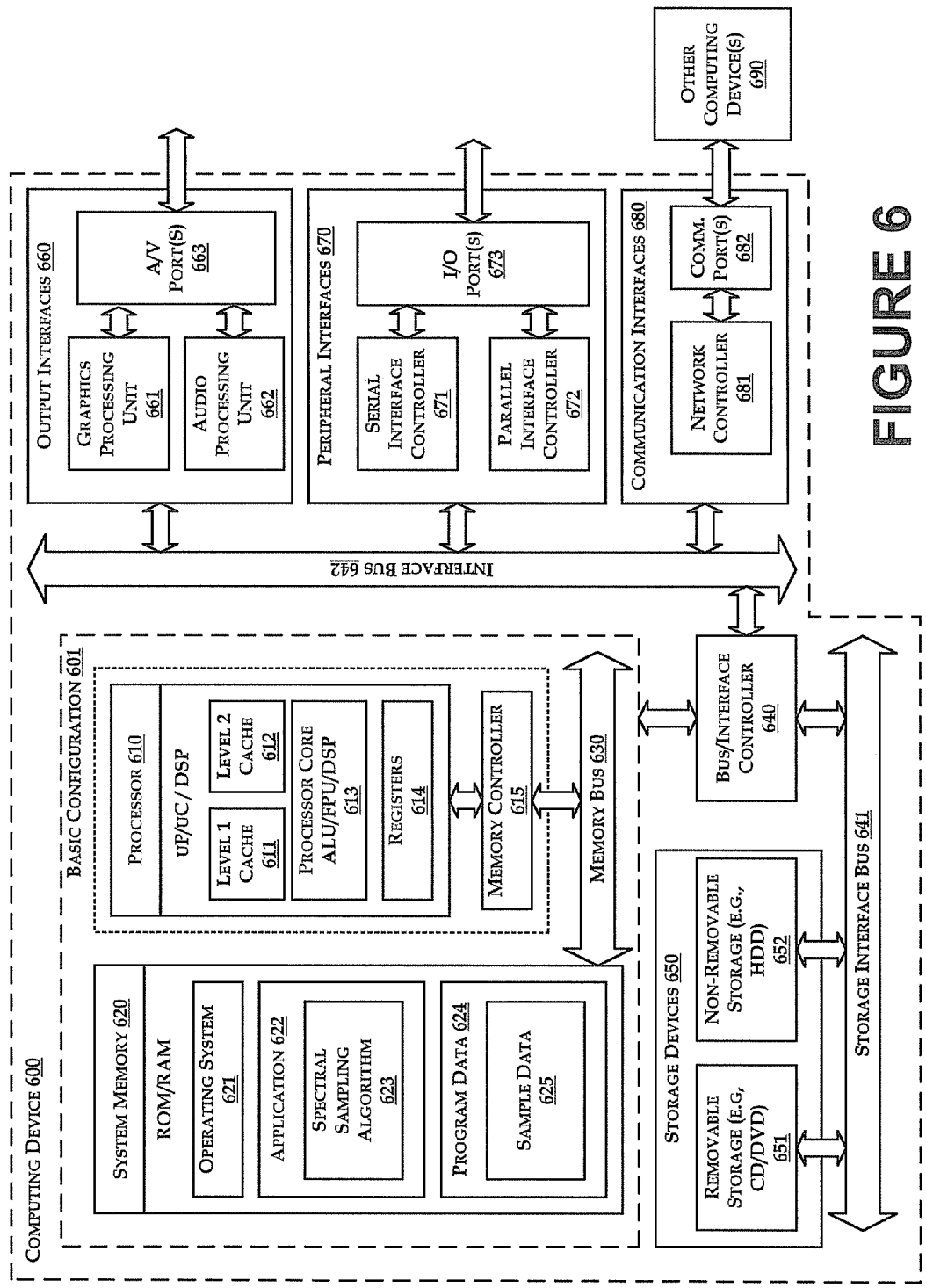
FIG. 6 is a functional block diagram illustrating an example computing device used in a digital signal processing system.

FIG. 6 is a functional block diagram illustrating an example computing device used in a digital signal processing system that is arranged in accordance with at least some embodiments described herein. In a very basic configuration 601, computing device 600 may typically include one or more processors 610 and system memory 620. A memory bus 630 can be used for communicating between the processor 610 and the system memory 620. Depending on the desired configuration, processor 610 can be of any type including but not limited to a microprocessor (µP), a microcontroller (µC), a digital signal processor (DSP), or any combination thereof. Processor 610 can include one more levels of caching, such as a level one cache 611 and a level two cache 612, a processor core 613, and registers 614. The processor core 613 can include an arithmetic logic unit (ALU), a floating point unit (FPU), a digital signal processing core (DSP Core), or any combination thereof. A memory controller 615 can also be used with the processor 610, or in some implementations the memory controller 615 can be an internal part of the processor 610.

Depending on the desired configuration, the system memory 620 can be of any type including but not limited to volatile memory (such as RAM), non-volatile memory (such as ROM, flash memory, etc.) or any combination thereof. System memory 620 typically includes an operating system 621, one or more applications 622, and program data 624. Application 622 may include sampling algorithm 623 that is arranged to provide inputs to the electronic circuits, in accordance with the present disclosure. Program Data 624 may include sample data 625 that could provide sampled data to the electronic circuits. In some example embodiments, application 622 can be arranged to operate with program data 624 on an operating system 621. This described basic configuration is illustrated in FIG. 6 by those components within dashed line 601.

Computing device 600 can have additional features or functionality, and additional interfaces to facilitate communications between the basic configuration 601 and any devices and interfaces. For example, a bus/interface controller 640 can be used to facilitate communications between the basic configuration 601 and one or more data storage devices 650 via a storage interface bus 641. The data storage devices 650 can be removable storage devices 651, non-removable storage devices 652, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Computer storage media can include volatile and nonvolatile, removable and non-removable media implemented in any method or technology for storage of information, such as computer readable instructions, data structures, program modules, or other data.

System memory 620, removable storage 651 and non-removable storage 652 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media can be part of device 600.

Computing device 600 can also include an interface bus 642 for facilitating communication from various interface devices (e.g., output interfaces, peripheral interfaces, and communication interfaces) to the basic configuration 601 via the bus/interface controller 640. Output interfaces 660 may include a graphics processing unit 661 and an audio processing unit 662, which can be configured to communicate to various external devices such as a display or speakers via one or more A/V ports 663. Peripheral interfaces 660 may include a serial interface controller 671 or a parallel interface controller 672, which can be configured to communicate with external devices such as input devices (e.g., keyboard, mouse, pen, voice input device, touch input device, etc.) or other peripheral devices (e.g., printer, scanner, etc.) via one or more I/O ports 673. A communication interface 680 may includes a network controller 681, which can be arranged to facilitate communications with one or more other computing devices 690 over a network communication via one or more communication ports 682. The Communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 600 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 can also be implemented as a personal computer including both laptop computer and non-laptop computer configurations.

Figure 7:
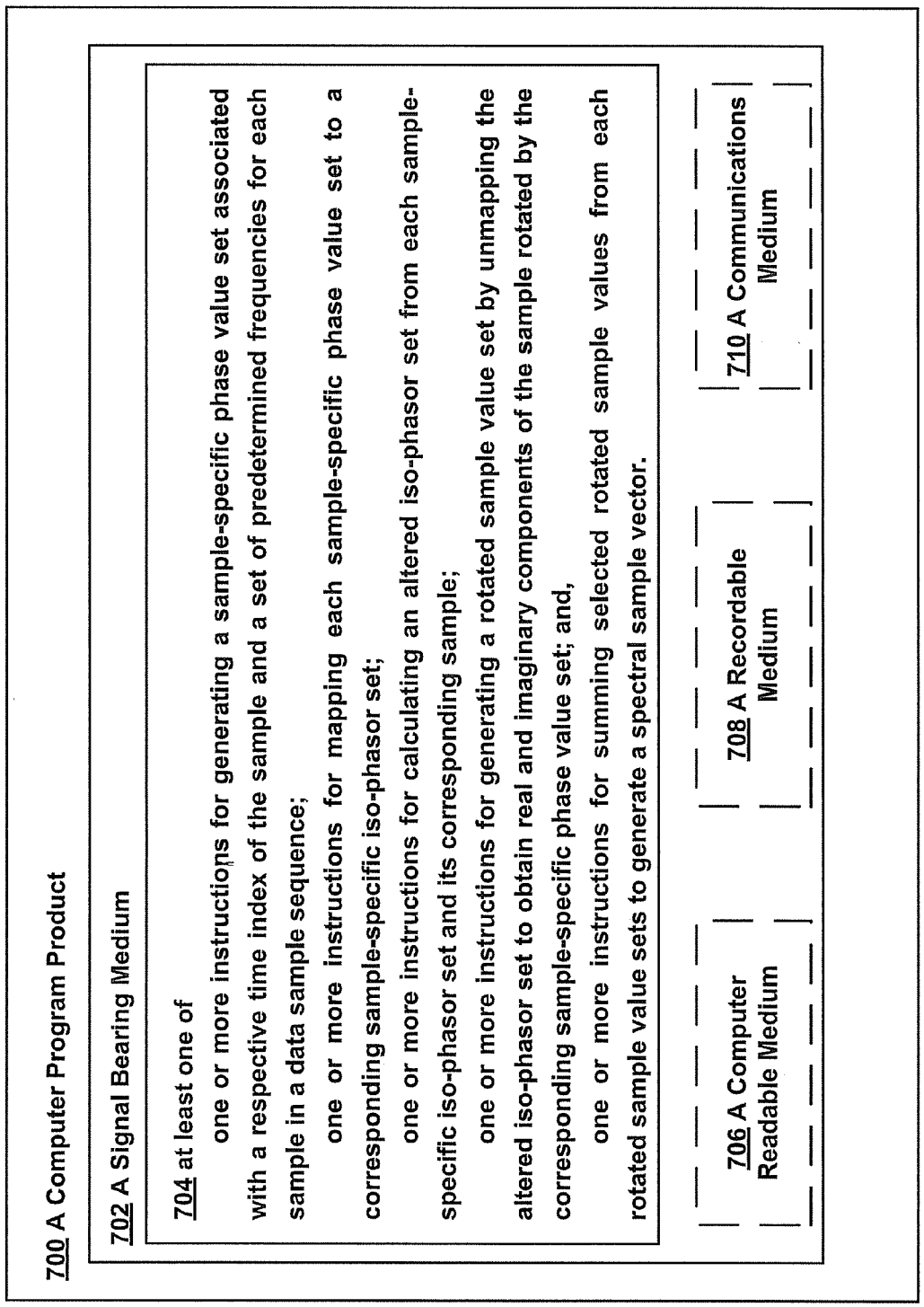
FIG. 7 illustrates an example computer program; all arranged in accordance with at least some embodiments of the present disclosure.

FIG. 7 illustrates an example computer program product 700 arranged in accordance with at least some examples of the present disclosure. Program product 700 may include a signal bearing medium 702. Signal bearing medium 702 may include one or more instructions 704 that, when executed by, for example, a processor, may provide the functionality described above with respect to FIGS. 1, 3, and 4. Thus, for example, referring to system 100, one or more of modules 110, 120, 130, 140, and/or 150 may undertake one or more of the blocks shown in FIG. 1 in response to instructions 704 conveyed to the system 100 by medium 702.

In some implementations, signal bearing medium 702 may encompass a computer-readable medium 706, such as, but not limited to, a hard disk drive, a Compact Disc (CD), a Digital Video Disk (DVD), a digital tape, memory, etc. In some implementations, signal bearing medium 702 may encompass a recordable medium 708, such as, but not limited to, memory, read/write (R/W) CDs, R/W DVDs, etc. In some implementations, signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, program product 700 may be conveyed to one or more modules of the system 100 by an RF signal bearing medium 702, where the signal bearing medium 702 is conveyed by a wireless communications medium 710 (e.g., a wireless communications medium conforming with the IEEE 802.11 standard).

In general, it should be understood that the circuits described herein may be implemented in hardware using integrated circuit development technologies, or yet via some other methods, or the combination of hardware and software objects that could be ordered, parameterized, and connected in a software environment to implement different functions described herein. For example, the present application may be implemented using a general purpose or dedicated processor running a software application through volatile or non-volatile memory. Also, the hardware objects could communicate using electrical signals, with states of the signals representing different data.

It should be further understood that this and other arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

It should be further understood that this and other arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions, or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A device for determining spectral samples of a finite length sequence at non-uniformly spaced frequency values, the device comprising an integrated circuit, including:
   a phase rotation set generator configured to generate sample-specific phase-value sets, each phase-value set associated with a respective time index of a sample from the finite length sequence and a set of predetermined frequencies;
   an iso-phasor mapper configured to map each of the sample-specific phase-value set to a corresponding sample-specific iso-phasor set;
   a multiplier configured to calculate an altered iso-phasor set from each sample-specific iso-phasor set and its corresponding sample;
   an unmapper configured to generate a rotated sample value set by unmapping the altered iso-phasor set to obtain real and imaginary components of the sample rotated by the corresponding sample-specific phase value set; and
   a summer configured to sum selected rotated sample values from each of the rotated sample value sets to generate a spectral sample vector.

2. The device of claim 1, further comprising:
   a frequency mapper configured to generate the predetermined frequencies.

3. The device of claim 2, wherein the frequency mapper is further configured to determine a set of available iso-phasors for inclusion in the sample-specific iso-phasor sets.

4. The device of claim 1, further comprising an error calculator configured to compare an error between a desired frequency and a corresponding predetermined frequency to a predetermined threshold.

5. The device of claim 4, wherein the frequency mapper is further configured to increase the number of available iso-phasors when the error exceeds the predetermined threshold.

6. The device of claim 1, wherein the iso-phasor mapper is further configured to generate at least one codeword associated with each sample-specific phase-value in the sample-specific phase-value set.

7. The device of claim 6, wherein the unmapper is configured to unmap the altered iso-phasor set based upon the at least one codeword.

8. An article of manufacture including a non-transitory computer readable medium having instructions stored thereon that, in response to execution by a computing device, cause the computing device to perform operations comprising:
   for each sample in a data sample sequence comprising a plurality of time-indexed samples, generating a sample-specific phase value set associated with a respective time index of the sample and a set of predetermined frequencies;
   mapping each sample-specific phase value set to a corresponding sample-specific iso-phasor set;
   calculating an altered iso-phasor set from each sample-specific iso-phasor set and its corresponding sample;
   generating a rotated sample value set by unmapping the altered iso-phasor set to obtain real and imaginary components of the sample rotated by the corresponding sample-specific phase value set; and,
   summing selected rotated sample values from each rotated sample value sets to generate a spectral sample vector.

9. The article of manufacture of claim 8, further comprising generating the predetermined frequencies with a frequency mapper.

10. The article of manufacture of claim 9, further comprising determining a set of available iso-phasors for inclusion in the sample-specific iso-phasor sets.

11. The article of manufacture of claim 8, further comprising comparing an error between a desired frequency and a corresponding predetermined frequency to a predetermined threshold.

12. The article of manufacture of claim 11, further comprising increasing the number of available iso-phasors when the error exceeds the predetermined threshold.

13. The article of manufacture of claim 8, further comprising generating at least one codeword associated with each sample-specific phase-value in the sample-specific phase-value set.

14. The article of manufacture of claim 13, further comprising unmapping the altered iso-phasor set is based upon the at least one codeword.

15. A method for determining spectral samples for a finite length sequence, the method comprising:
   for each sample in a data sample sequence comprising a plurality of time-indexed samples, generating, by a processor, a sample-specific phase value set associated with a respective time index of the sample and a set of predetermined frequencies;

mapping, by a processor, each sample-specific phase value set to a corresponding sample-specific iso-phasor set;

calculating, by a processor, an altered iso-phasor set from each sample-specific iso-phasor set and its corresponding sample;

generating, by a processor, a rotated sample value set by unmapping the altered iso-phasor set to obtain real and imaginary components of the sample rotated by the corresponding sample-specific phase value set; and, summing, by a processor, selected rotated sample values from each rotated sample value sets to generate a spectral sample vector.

16. The method of claim 15, further comprising:
generating the predetermined frequencies with a frequency mapper; and
determining a set of available iso-phasors for inclusion in the sample-specific iso-phasor sets.

17. The method of claim 15, further comprising comparing an error between a desired frequency and a corresponding predetermined frequency to a predetermined threshold.

18. The method of claim 17, further comprising increasing the number of available iso-phasors when the error exceeds the predetermined threshold.

19. The method of claim 15, further comprising generating at least one codeword associated with each sample-specific phase-value in the sample-specific phase-value set.

20. The method of claim 19, further comprising unmapping the altered iso-phasor set is based upon the at least one codeword.

* * * * *

UNITED STATES PATENT AND TRADEMARK OFFICE
CERTIFICATE OF CORRECTION

PATENT NO. : 8,594,167 B2
APPLICATION NO. : 13/265498
DATED : November 26, 2013
INVENTOR(S) : Yedlapalli et al.

It is certified that error appears in the above-identified patent and that said Letters Patent is hereby corrected as shown below:

In the Specification:

In Column 12, Line 46, delete "one to" and insert -- one to $L_x$. --, therefor.

In Column 13, Line 24, delete "an imaginary" and insert -- and imaginary --, therefor.

In Column 20, Line 11, delete "iso-phaor" and insert -- Iso-phasor --, therefor.

In Columns 23 & 24, Lines 65-67 & 1-8, delete "It should be......and location.".

Signed and Sealed this
Twenty-seventh Day of May, 2014

Michelle K. Lee
*Deputy Director of the United States Patent and Trademark Office*